United States Patent
Goettl et al.

(10) Patent No.: US 11,783,394 B2
(45) Date of Patent: Oct. 10, 2023

(54) AUTOMATED PRODUCT UPDATE ANALYSIS AND MANAGEMENT

(71) Applicant: Ivanti, Inc., South Jordan, UT (US)

(72) Inventors: Christopher J. Goettl, Owatonna, MN (US); Darci Taylor, Salt Lake City, UT (US); James Sferas, Salt Lake City, UT (US); Josh Kilts, Saratoga Springs, UT (US); David Brylyn, Manchester (GB); Rex McMillan, South Jordan, UT (US)

(73) Assignee: Ivanti, Inc., South Jordan, UT (US)

( * ) Notice: Subject to any disclaimer, the term of this patent is extended or adjusted under 35 U.S.C. 154(b) by 0 days.

(21) Appl. No.: 17/500,830

(22) Filed: Oct. 13, 2021

(65) Prior Publication Data
US 2022/0122136 A1      Apr. 21, 2022

Related U.S. Application Data

(60) Provisional application No. 63/092,109, filed on Oct. 15, 2020.

(51) Int. Cl.
*G06Q 30/06*      (2023.01)
*G06Q 30/0601*      (2023.01)

(52) U.S. Cl.
CPC ................ *G06Q 30/0601* (2013.01)

(58) Field of Classification Search
CPC ................................ G06Q 30/0601
USPC ...................................... 705/26.1
See application file for complete search history.

(56) References Cited

U.S. PATENT DOCUMENTS

| | | | |
|---|---|---|---|
| 10,042,625 B2* | 8/2018 | El Maghraoui | G06F 40/30 |
| 10,459,766 B1* | 10/2019 | Sloane | G06F 9/5011 |
| 2012/0016948 A1* | 1/2012 | Sinha | G06Q 10/10 |
| | | | 706/20 |

(Continued)

FOREIGN PATENT DOCUMENTS

WO      WO-2004030389 A1 *      4/2004      ............ G06F 21/44

OTHER PUBLICATIONS

Thesis, PreviewOn the impact of affect in software engineering Tourani, Parastou. Montreal, Canada; ProQuest Dissertations and Theses ProQuest Dissertations Publishing Dec. 2016 (2016); retrieved from Dialog on Feb. 10, 2023. (Year: 2016).*

*Primary Examiner* — Yogesh C Garg

(57) ABSTRACT

A method of product update analysis and management includes receiving metadata of a product update related to a code change of an application on an endpoint of a managed network. The method includes scraping posts related to the product update from two different internet websites. The method includes aggregating the posts from the internet websites. The method includes quantifying a social volume from the aggregated posts. The social volume being a measure of discussion related to the product update. The method includes extracting content from the aggregated posts. Based on the extracted content, the method includes summarizing the posts into a collection of terms or phrases representative of a topic of the posts. The method includes causing display of an indication of the social volume and the collection of terms or phrases. The method includes implementing the product update to affect a change in program code at the application.

18 Claims, 9 Drawing Sheets

(56) References Cited

U.S. PATENT DOCUMENTS

| | | | |
|---|---|---|---|
| 2013/0047147 A1* | 2/2013 | McNeill | G06F 9/45533 717/173 |
| 2016/0239581 A1* | 8/2016 | Jaidka | H04L 51/52 |
| 2020/0151577 A1* | 5/2020 | Ogawa | G06N 3/08 |
| 2020/0167464 A1* | 5/2020 | Griffin | G06N 5/02 |

* cited by examiner

AUTOMATED PRODUCT UPDATE ANALYSIS AND MANAGEMENT

CROSS-REFERENCE TO RELATED APPLICATION

This application claims priority to and the benefit of U.S. Provisional Patent No. 63/092,109, filed Oct. 15, 2020, which is incorporate herein by reference in its entirety.

FIELD

The embodiments described in this disclosure are related to automated product update analysis and management, and in particular to automated product update analysis using posts scraped from websites.

BACKGROUND

In enterprise and other managed networks, an endpoint refers to a computing device that is integrated into the network and that is in communication with a management device. The management device may include a server device, for instance, that has visibility to operating parameters and state parameters of the endpoints. Based on information communicated between the management device and the endpoints, the management device may detect issues at the endpoints, deploy solutions to the endpoints, update software on the endpoints, troubleshoot issues at the endpoints, provision rolls and security controls to the endpoints, etc.

One element of the managed networks is coordination and distribution of product updates. Sometimes this operation is referred to as patch management. The product updates or patches generally include code changes to products on the managed endpoints or some subset thereof. The products that are updated include software applications, software tools, operating systems, and the like. Distribution of the updates is important to ensure the products are properly functioning and to ensure cybersecurity vulnerabilities are addressed.

In some circumstances, a vendor publicizes the updates that are relevant to its products. Publication of the updates is an ongoing process. For instance, MICROSOFT® has traditionally released software patches on "Patch Tuesday" which occurs on the second and sometimes the fourth Tuesday of each month. In addition, software patches might be released and published responsive to detection of a specific vulnerability. Following publication of the software patches, administrators of the managed networks may access and distribute the product updates to the endpoints.

Sometimes the product updates introduce additional problems into systems. For example, installation of a patch may result in a crash of a computing device or disable some other functionality. Accordingly, administrators may delay implementation of product updates while they research whether the product update can be implemented without causing another issue. The delay in implementation may result in a managed network being vulnerable. Likewise, some administrators immediately implement product updates. Again, some of these product updates introduce problems to the endpoints. Accordingly, the administrator must then remove the product update and/or repair the problem introduced by the product update. Accordingly, there is a need to provide automated product update analysis. The product update analysis may provide previously unavailable information to a management system and may improve efficiency and security of managed networks.

The subject matter claimed herein is not limited to embodiments that solve any disadvantages or that operate only in environments such as those described. Rather, this background is only provided to illustrate one example technology area where some embodiments described herein may be practiced.

SUMMARY

According to an aspect of the invention, an embodiment includes a method of automated product update analysis and management. The method may include receiving metadata. The metadata may be related to a first product update, which may be recommended for implementation in a manage network. The first product update may be related to a code change or a software patch of an application on one or more endpoints of the managed network. The method may include further receiving metadata of additional product updates. The additional product updates may be related to code changes or software patches of one or more additional applications on the endpoints. The first product update and the additional product updates may be analyzed together. For example, the first product update and the additional product updates may be released within a predetermined time of one another or in a single bulletin, which may increase a likelihood that posts relating to them will occur during the same period of time. The method may include scraping posts. The posts may be related to the product update. The posts may be scraped from two or more different internet websites. The scraping may be based on a data identifier related to the first product update and the additional product updates. The data identifier may include a knowledge base (KB) numbers or patch bulletin numbers. The method may include aggregating the posts from the internet websites. The method may include quantifying a social volume from the aggregated posts for the first product update and the additional product updates. The social volumes may be a measure of discussion related to each of the first product update and the additional product updates. The quantifying the social volume may include blending two or more types of acceptance information. For instance, quantifying the social volume may include blending ranks associated with the posts on a first web site with a number of reposts of the posts from a second web site. The method may include normalizing the social volume of the first product updates relative to additional social volumes quantified for the additional product updates. The method may include ranking the social volume of the first product update. The social volume of the first product update may be ranked relative to the social volumes of the additional product updates. Two or more operations may be implemented to rank the social volume. For instance, the ranking may be performed based on a percentile calculation of the social volumes of the first product update and the additional product updates. Additionally, the ranking may be performed according to a K-means clustering or another suitable clustering operation. The method may include extracting content from the aggregated posts. Extracting the content may include filtering non-informational content. Based on the extracted content, the method may include summarizing the posts into a collection of terms or phrases. The collection of terms or phrases may be representative of a topic of the posts. The summarizing the posts may be based on a natural language processing (NLP) operation. In some embodiments, the NLP operation may be a supervised or unsupervised methodology that may be implemented to model the topic of the posts. For instance, the NLP operation might include a graph-based ranking operation or a Latent Dirichlet Allocation operation. The method may include causing display of an indication of the social volume and of the collection of terms or phrases. In embodiments in which the social volume is based on a percentile calculation, the indication of the social volume of the first product update may include an icon representative of the percentile in which the social volume is placed. In embodiments in which the ranking is performed according to a K-means clustering, the indication of the social volume of the first product update may include an icon representative of a cluster in which the social volume is placed. The indication of the social volume and of the collection of terms or phrases may be displayed prior to implementation of the product update in the managed network. The indication of the social volume may be displayed with data related to the product update in a user interface. Additionally, the collection of terms or phrases may be analyzed to determine whether the topic of the posts is a problem with the product update. Responsive to the topic being a problem, the method may include identifying a link to a solution to the problem and causing display of the link. One or more portions of the method may be repeated. For instance, the method may include re-scraping the internet websites for additional posts regarding the product update. The method may include causing display of an updated indication of the social volume and an updated collection of terms or phrases. The updated indication of the social volume may reflect an updated social volume based on the additional posts. The updated collection may be based on a summary of the additional posts. The re-scraping the internet websites and the causing display of the updated indication may be performed according to an interval for a predetermined time period. The method may include implementing the product update. Implementation of the product update may be such that the code change is incorporated in the application to modify a portion of a code that makes up the application.

A further aspect of an embodiment may include non-transitory computer-readable medium having encoded therein programming code executable by one or more processors to perform or control performance of one or more of the operations of the methods described above.

An additional aspect of an embodiment may include computing device comprising one or more processors and a non-transitory computer-readable medium having encoded therein programming code executable by one or more processors to perform or control performance of one or more of the operations of the methods described above.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF SOME EXAMPLE EMBODIMENTS

The embodiments described in this disclosure are related to automated product update analysis and management. In particular to automated product update analysis using posts scraped from websites to determine a social volume of a patch product and a collection of terms and phrases that is representative of topics of the posts. Embodiments of the present disclosure include systems and methods in which the social volume and the collection of terms and phrases is used to manage product update implementation and distribution to a managed network of endpoints.

The embodiments of the present disclosure address technical problems that exist in conventional patch management systems. For instance, in some conventional managed networks, product update management is conducted without knowledge from entities that have implemented recommended product updates. Instead, implementation of product updates in convention systems are delayed while an administrator researches the effectiveness, which may result in persistence of vulnerabilities at managed endpoints. Alternatively, the product updates are implemented without this knowledge, which might result in introduction of problems at the managed endpoints. These conventional management systems suffer from persistence of vulnerabilities at the endpoints and inefficient vulnerability management.

Some embodiments of the present disclosure address these problems. For instance, embodiments include systems and processes that perform an automated product update analysis. The product update analysis is based on posts scraped from social media websites. From the posts, a social volume and a collection of terms and phrases are generated. The social volume is a measure of an amount of discussion regarding the product update. The collection is a summary of topics of the posts. These metrics are visible to an administrator and/or used by a management device to manage distribution and implementation of product updates.

These and other embodiments are described with reference to the appended Figures in which like item number indicates like function and structure unless described otherwise. The configurations of the present systems and methods, as generally described and illustrated in the Figures herein, may be arranged and designed in different configurations. Thus, the following detailed description of the Figures, is not intended to limit the scope of the systems and methods, as claimed, but is merely representative of example configurations of the systems and methods.

Figure 1:
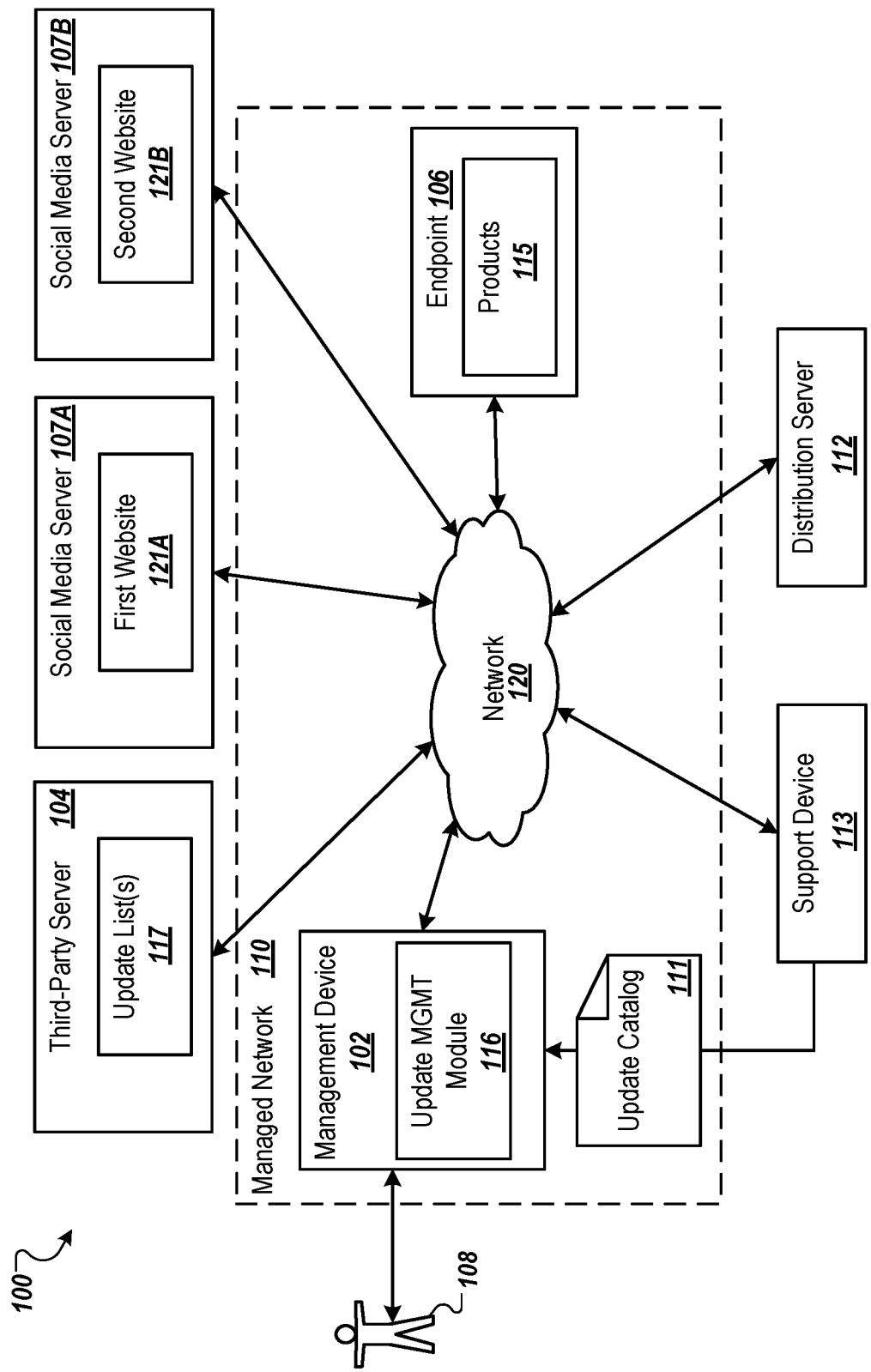
FIG. 1 depicts a block diagram of an example operating environment in some embodiments described in the present disclosure may be implemented.

FIG. 1 is a block diagram of an example operating environment 100 in which some embodiments of the present invention can be implemented. The operating environment 100 may be configured for implementation of product update management in a manage network 110. The product update management may enable product updates such as software patches and code changes to be accessed, consumed, and distributed to an endpoint 106 of the managed network 110.

In the managed network 110, one or more product update management operations may be performed to analyze of product updates based on posts on websites 121A and 121B (generally, website 121 or websites 121). For example, a social volume and a collection of terms and phrases (hereinafter, "collection") may be generated to help analyze product updates. The social volume includes a measure of how much one of the product updates is being discussed on the websites 121. A high social volume may indicate that the product update is the topic of many posts that are being relayed and accepted by users of the websites 121. Additionally, the high social volume may be indicative of a problem with the product update. A low social volume may indicate that there is not much or no discussion of the product update on the websites 121. The low social volume may further indicate that implementation of the product update is issue-free. Accordingly, the social volume may provide valuable feedback to a management device 102 and an administrator 108 of the managed network 110.

Additionally, the collection may include words, terms, phrases that are representative of the topics of the posts. The collection may be displayed to the administrator 108, which may enable review of topics of the posts, which provides feedback regarding experiences of others who have implemented the product update. Additionally, the collection or data included therein may be analyzed by the management device 102 to determine possible solutions to issues identified in the posts and to dictate distribution and implementation of the product updates.

The collection and the social volume may be displayed to the administrator 108. The collection and the social volume may be included with data that is provided to the administrator 108 in a patch intelligence user interface. Some additional details of an example user interface are provided with reference to FIG. 3. Based on the collection and the social volume, the administrator 108 may better manage product updates at the endpoint 106. Additionally, the management device 102 may operate based on the social volume and the collection generated from the posts. For instance, the management device 102 may base a distribution operation or prevent a distribution operation responsive to the social volume being above or below a threshold. Moreover, the management device 102 may be configured to preemptively determine and implement solutions to issues based on the collection.

Embodiments of the present disclosure provide a technical improvement to conventional patch management systems. For instance, in some conventional patch management systems, endpoints are managed using published product updates and bulletins. Administrators of these conventional patch management systems may delay implementation of some product updates while the administrator researches the product updates. For example, the administrator may wait until the patch is implemented by other managed networks and review various sources of user feedback. During this delay, a vulnerability which is addressed by the product update may be exploited or may become critical.

Additionally, the conventional patch management systems do not consider or analyze information in posts in websites. Instead, in these conventional patch management systems, the administrator might perform some searching or simply implement the product update without any feedback. The administrator may accordingly implement the product update with known issues, which may require correction (e.g., withdrawing the product update, performing a corrective action, and re-distributing the product update). These technical problems lead to inefficient patch management in which administrators are making determinations with limited information and patch management devices operating without considering the posts from the websites 121.

Some embodiments of the present disclosure improve conventional patch management systems and address the inefficiencies and technical issues described above. For instance, some embodiments of the management device 102 analyze and act on information of posts of the websites 121. The posts include information with feedback regarding characteristics of a product update from actual users, who have implemented the product update or otherwise analyzed the product update. The actual users may be experts in the field of the patch management or cyber-vulnerability management and may be "early adopters" in these fields. Accordingly, the posts might outline problems experienced in implementation and solutions to the problems. Based on the posts, the administrator 108 of the managed network 110 may make informed decisions regarding distribution and implementation of the product update. Moreover, information of the posts may be used by the management device 102 in one or more automated patch management operations. In particular, the information of the posts may limit or prohibit distribution of product updates. Additionally or alternatively, the information of the posts may motivate distribution of the product update. For instance, the product update may be emphasized as important or critical and is being discussed with significant representation in the posts.

Accordingly, embodiments of the present disclosure are directed to a computer-centric problem and are implemented in a computer-centric environment. For instance, the embodiments of the present disclosure are directed to product update management in the managed network 110. Computing processes occurring in the operating environment 100 include communication and implementation of product updates that include software patches and code changes on products 115 loaded on the endpoint 106. Communications during the processes described in this present disclosure involve the communication of data in electronic and optical forms via a network 120 and also involve the electrical and optical interpretation of the data and information.

Furthermore, the embodiments of the present disclosure address a technical issue that exists in a technical environment. The technical issue includes an inability of conventional patch management systems to manage product updates based on posts accessed on the websites 121 and the inefficiencies that result therefrom. The technical problem is solved through a technical solution. For instance, the technical solution involves scraping posts from the websites 121, quantifying the social volumes based on the scraped posts, generating the collection, displaying the social volume and collection, and automatically operating patch distribution and implementation of based on the social volume and the collection.

The operating environment 100 may include the managed network 110, a third-party server 104, a support device 113, social media servers 107A and 107B (generally, social media server 107 or social media servers 107), and a distribution server 112. The managed network 110 includes the management device 102 that may communicate with the third-party server 104, the support device 113, the social media servers 107, the endpoint 106, and the distribution server 112 via the network 120. The components of the operating environment 100 are configured to communicate data and information via the network 120 to perform product update analysis management operations as described in the present disclosure. Each of these components are described below.

The network 120 may include any communication network configured for communication of signals between the components (e.g., 102, 107, 113, 108, 112, 104, and 106) of the operating environment 100. The network 120 may be wired or wireless. The network 120 may have configurations including a star configuration, a token ring configuration, or another suitable configuration. Furthermore, the network 120 may include a local area network (LAN), a wide area network (WAN) (e.g., the Internet), and/or other interconnected data paths across which multiple devices may communicate. In some embodiments, the network 120 may include a peer-to-peer network. The network 120 may also be coupled to or include portions of a telecommunications network that may enable communication of data in a variety of different communication protocols.

In some embodiments, the network 120 includes or is configured to include a BLUETOOTH® communication network, a Z-Wave® communication network, an Insteon® communication network, an EnOcean® communication network, a Wi-Fi communication network, a ZigBee communication network, a representative state transfer application protocol interface (REST API) communication network, an extensible messaging and presence protocol (XMPP) communication network, a cellular communications network, any similar communication networks, or any combination thereof for sending and receiving data. The data communicated in the network 120 may include data communicated via short messaging service (SMS), multimedia messaging service (MMS), hypertext transfer protocol (HTTP), direct data connection, wireless application protocol (WAP), or any other protocol that may be implemented in the components of the operating environment 100.

The third-party server 104 includes a hardware-based computer device or collection thereof that is configured to communicate with the other components of the operating environment 100 via the network 120. The third-party server 104 is configured to provide access to one or more update lists 117, bulletins related to product updates, portions thereof, and information pertaining to entries of the update lists 117. For instance, the third-party server 104 may host a website on which the update lists 117 or bulletins are available. The third-party server 104 may host or store the update lists 117 such that information and metadata related to entries on the update lists 117 may be accessed via the network 120. In some embodiments, the management device 102 or the support device 113 may be configured to access the update lists 117 or information related to entries on the update lists 117 via the network 120. In some embodiments, the management device 102 or the support device 113 may be configured to communicate an electronic message to the third-party server 104 that accesses the update lists 117, information (e.g., update metadata) related to entries on the update lists 117, or a specific portion of the update lists 117.

Some examples of example APIs for accessing the update lists 117 are available at https://www.circl.lu/services/cve-search/.

The update lists 117 may include a list of entries. The entries relate to a cybersecurity threat, a cybersecurity vulnerability, a software application code change, a patch, a hardware interface modification, or another update to a product, which are collectively referred to as product updates in the present disclosure. The entries have information related to the entries. For instance, one or more of the entries may include an identification number, an entry date, an entry summary, a links to product updates (e.g., a code change or patch), a threat severity, or some combination thereof.

An example of the third-party server 104 may be Department of Homeland Security (DHS) server(s). In this example, the update lists 117 may include lists of common vulnerabilities and exposures (CVEs) hosted by the DHS servers. Another example of the third-party server 104 may be National Institute of Standards and Technology (NIST) servers. In this example, the update lists 117 may include national vulnerability database that is hosted by the NIST servers. One with skill in the art may be familiar with other suitable examples of the third-party server 104 and the update lists 117. Lists of vulnerabilities and threats are maintained by some additional entities such as MITRE.

The depicted embodiment of the operating environment 100 includes the support device 113. The support device 113 may be a hardware-based computer device configured to communicate data and information with the other components of the operating environment 100 via the network 120. In embodiments that include the support device 113, the update lists 117 may be consumed at the support device 113 to generate or update an update catalog 111. The update catalog 111 includes records and information related to previous product updates. As the update lists 117 or bulletins become available, update metadata or other information maybe appended to the update catalog 111. The support device 113 may communicate the update catalog 111 to the management device 102 or may otherwise make available the update catalog 111 in the managed network 110. In some instances, the update catalog 111 may be stored at least temporarily at the management device 102. In other instances, the update catalog 111 may be stored remotely and accessed by the management device 102 via the network 120. In FIG. 1, the update catalog 111 is depicted as being communicated outside the network 120. In some embodiments, the update catalog 111 may be communicated or accessed via the network 120.

In some embodiments, the operating environment 100 may not include the support device 113. In these embodiments, the management device 102 might directly consume information of the update lists 117.

The depicted embodiment of the operating environment 100 includes the distribution server 112. The distribution server 112 may be a hardware-based server configured to communicate data and information with the other components of the operating environment 100 via the network 120. The distribution server 112 may be configured to store published product updates or instructions related to published product updates. For example, in some embodiments, the management device 102 may communicate one or more product updates to the distribution server 112. The endpoint 106 may then access the product updates at the distribution server 112. After the product updates are accessed, the product updates may be implemented at the endpoint 106 to modify code of the products 115 on the endpoint 106. An example of the distribution server 112 may include a Windows® Server Update Services (WSUS) server. In some embodiments, the operating environment 100 may omit the distribution server 112. Additionally or alternatively, the distribution server 112 may be used for a portion of product updates and not used for another portion of the product updates.

The managed network 110 includes the management device 102 and the endpoint 106. The managed network 110 is implemented to enable management of the endpoint 106 by the management device 102. To implement the managed network 110, the endpoint 106 may be enrolled. After the endpoint 106 is enrolled, ongoing management of the endpoint 106 may be implemented by the management device 102. The ongoing management may include overseeing and dictating at least a part of the operations at the endpoint 106 as well as dictate or control product updates implemented at the endpoint 106 as described in the present disclosure.

The management device 102 is configured to manage product updates at the endpoint 106. In general, management of the product updates may include determining which product updates pertain to products 115, to determine which of the product updates to distribute to the endpoint 106, and to distribute the product updates to the endpoint 106 such that the product updates may be locally implemented. Implementation of the product updates at the endpoint 106 include modification to computer code, programming code, or computer-executable instructions of a program that comprise at least one of the products 115.

The endpoint 106 may include hardware-based computer system that is configured to communicate with the other components of the operating environment 100 via the network 120. The endpoint 106 may include any computer device that may be managed by the management device 102 and/or have been enrolled in the managed network 110. Generally, the endpoint 106 includes a device that is operated by the personnel or system of an enterprise or stores data of the enterprise. The endpoint 106 might include a workstation of an enterprise, a server, a data storage system, a printer, a telephone, an internet of things (IOT) device, a smart watch, a sensor, an automobile, a battery charging device, a scanner device, etc. The endpoint 106 may also include a virtual machine, which may include a portion of a single processing unit or one or more portions of multiple processing units, which may be included in multiple machines. The endpoint 106 may be referred to as managed endpoint when the endpoint 106 is enrolled in the managed network 110.

The endpoint 106 includes the products 115. The products 115 may include applications of any kind or type. Some examples of the products 115 may include software applications, enterprise software, operating systems, hardware management programs, and the like.

The social media servers 107 may include hardware-based computer systems that are configured to communicate with the other components of the operating environment 100 via the network 120. The social media servers 107 host the websites 121. The websites 121 are social media websites on which users can publish posts and interface (e.g., provide feedback) regarding the posts published by users. For example, a first user of the website 121 may draft and publish a post on a first website 121A. A second user of the first website 121A may view the post in a feed of the first user or in a sub-forum of the first website 121A. The second user may interact in a variety of ways with the post. For instance, the second user may repost the original post to a feed of the second user, may vote for the post, may comment on the post, may like (or dislike, love, attach an emoji, etc.) the post, may share the post, or may otherwise interact with the post. Some or all of the data related to the interaction with the post may be recorded by the first website 121A. Additionally, the posts and the data related to the interaction with the post may be accessed or scraped by devices (e.g., the management device 102) via the network 120. Some examples of the social media server 107 may include a TWITTER® server, a REDDIT® server, a FACEBOOK® server, a GOOGLE® server, a WeChat® server, or a server operated by another entity on which users, who may be regarded as experts in the field, publish posts, articles, or other content regarding product update management, patch management, and other topics related to cybersecurity or product vulnerabilities.

The management device 102 may include hardware-based computer system that is configured to communicate with the other components of the operating environment 100 via the network 120. The management device 102 may be associated with the administrator 108. The administrator 108 may be an individual, a set of individuals, or a system that interfaces with the management device 102. In some embodiments, the administrator 108 may be provide user input to the management device 102. The user input provided by the administrator 108 may form the basis of some computing processes performed by the management device 102. For example, the administrator 108 may provide user input at a user interface associated with the management device 102. The user input may indicate that the administrator 108 intends on distributing or implementing a subset of product updates. The user input may take the form of a selection of an icon or a button on a user interface displayed the management device 102.

The management device 102 may include an update management module 116 (in the Figures, "update MGMT module"). The update management module 116 may be configured for automated product update analysis and management in the managed network 110 based on information scraped from posts on the websites 121. For example, in some embodiments, the update management module 116 may be configured to receive metadata of a first product update. For example, the metadata may be received from the support device 113 or the third-party server 104. The metadata may be included in the update catalog or the update lists 117. The first product update may be related to a code change or a software patch of one of the products 115 (e.g., an application) on the endpoint 106.

The update management module 116 may further receive metadata of additional product updates. The additional product updates may be related to code changes or software patches of one or more other products 115 or applications on the endpoint 106. The first product update and the additional product updates may be released within a predetermined time of one another or may be otherwise related. For instance, the first product update and the additional product updates may be part of one bulletin or may be included in bulletins that are released with a short period (e.g., one or two days) of one another.

The update management module 116 may scrape posts related to the first product update from the websites 121. In some embodiments, the scrape operation may be based on a data identifier such as a KB number, a patch bulletin number, or other suitable information associated with the first patch update or some data included in posts. The posts scraped from the websites 121 may be different. For instance, the posts may include different information and different formats. To enable processing of the posts, the update management module 116 may aggregate the posts or post information. Aggregation of the posts or the post information may involve combination of the post information and reformatting the post information.

The update management module 116 may quantify the social volume from the aggregated posts. The social volume may be a measure of relevant discussion related to the product update. As used in the context of the social volume, the term "relevant" may include informational posts while filtering non-informational posts. Informational posts may be identified by acceptance information (e.g., a volume of engagement and peer agreement), key phrases in the content of the posts, or other relevant factors. In contrast, the non-informational post may be identified by its length, inclusion of certain words indicative of a substance-less content, or a reaction or a lack of reaction to the post by other users. Relevant discussion may indicate that non-informational posts are removed from the informational posts.

In some embodiments, quantification of the social volume includes blending two or more different types of acceptance information from the different websites 121. Acceptance information may include rank numbers, repost numbers, likes (dislike, love, attach an emoji, etc.), shares, comments, or other information indicating acceptance or support of users of the websites 121. Accordingly, blending different types of acceptance information may include blending ranks associated with the posts on the first website 121A with a number of re-posts associated with posts in the second website 121B.

The update management module 116 may normalize the social volume of the first product updates relative to additional social volumes quantified for each of the additional product updates. Normalization may enable the social volume of the first product update to viewed relative to social volumes of the additional social values rather than as an absolute number.

The update management module 116 may rank the social volume of the first product update relative to the social volumes of the additional product updates. In some embodiments, the update management module 116 may perform a rank operation based on a percentile of the social volumes of the first product update and the additional product updates. Additionally or alternatively, the update management module 116 may perform a rank operation based on a clustering operation such as K-means clustering. An icon indicating the social volume may be based on the rank of the social volume. For instance, the indication of the social volume of the first product update includes an icon representative of the percentile or the cluster of the social volume.

The update management module 116 may extract content from the aggregated posts or aggregated post information. In some embodiments, the extracting the content may include filtering the non-informational content such that the non-informational content is not further considered. Based on the extracted content, the update management module 116 may summarize the posts to generate the collection. The collection is representative of one or more topics of the posts. The summarizing the posts may be based on a natural language processing (NLP) operation. The NLP operation may be a supervised or an unsupervised methodology that may be implemented to model the topic of the posts. For instance, the NLP operation might include a graph-based ranking operation or a Latent Dirichlet Allocation operation.

The update management module 116 may cause display of the indication of the social volume and of the collection. The indication of the social volume and the collection may be displayed in a user interface with other data associated with the first product update. In some embodiments, the indication of the social volume and of the collection are displayed prior to implementation of the first product update. Accordingly, the social volume and the collection may be considered by the administrator 108. Additionally, social volume data and collection data may be input to the update management module 116, which may limit or otherwise dictate implementation of the first product update. Additionally or alternatively, the social volume data and collection data may motivate distribution of the product update because the product update is emphasized as important or critical in the posts.

The update management module 116 may repeat portions of the operations described above. For example, the update management module 116 may be configured to re-scrape the websites 121 for additional posts regarding the first product update. The update management module 116 may cause display of an updated indication of the social volume and an updated collection. The updated indication of the social volume reflects an updated social volume based on the additional posts. The updated collection is based on a summary of the additional posts. The update management module 116 may re-scrape the websites 121 and cause display of the updated information may be performed according to an interval for a predetermined time period. For instance, the update management module 116 may re-scrape the websites 121 once a day for thirty (30) days, sixty (60) days, ninety (90) days or another suitable time period.

The update management module 116 may implement the first product update. Implementation of the first product update includes a code change occurs at the products 115 or applications on the endpoint 106. Implementation of the first product update modifies a portion of a program code that makes up the product 115, which may result in a different function of the product 115.

The update management module 116, the products 115, and components thereof may be implemented using hardware including a processor, a microprocessor (e.g., to perform or control performance of one or more operations), a field-programmable gate array (FPGA), or an application-specific integrated circuit (ASIC). In some other instances, the update management module 116, the products 115, and components thereof may be implemented using a combination of hardware and software. Implementation in software may include rapid activation and deactivation of one or more transistors or transistor elements such as may be included in hardware of a computing system (e.g., the endpoints 106 or the management device 102 of FIG. 1). Additionally, software defined instructions may operate on information within transistor elements. Implementation of software instructions may at least temporarily reconfigure electronic pathways and transform computing hardware.

Modifications, additions, or omissions may be made to the operating environment 100 without departing from the scope of the present disclosure. For example, the operating environment 100 may include one or more managed networks 110, one or more management devices 102, one or more support devices 113, one or more endpoints 106, one or more third-party servers 104, one or more distribution servers 112, one or more social media servers 107, or any combination thereof. Moreover, the separation of various components and devices in the embodiments described herein is not meant to indicate that the separation occurs in all embodiments. Moreover, it may be understood with the benefit of this disclosure that the described components and servers may generally be integrated together in a single component or server or separated into multiple components or servers.

Figure 2:
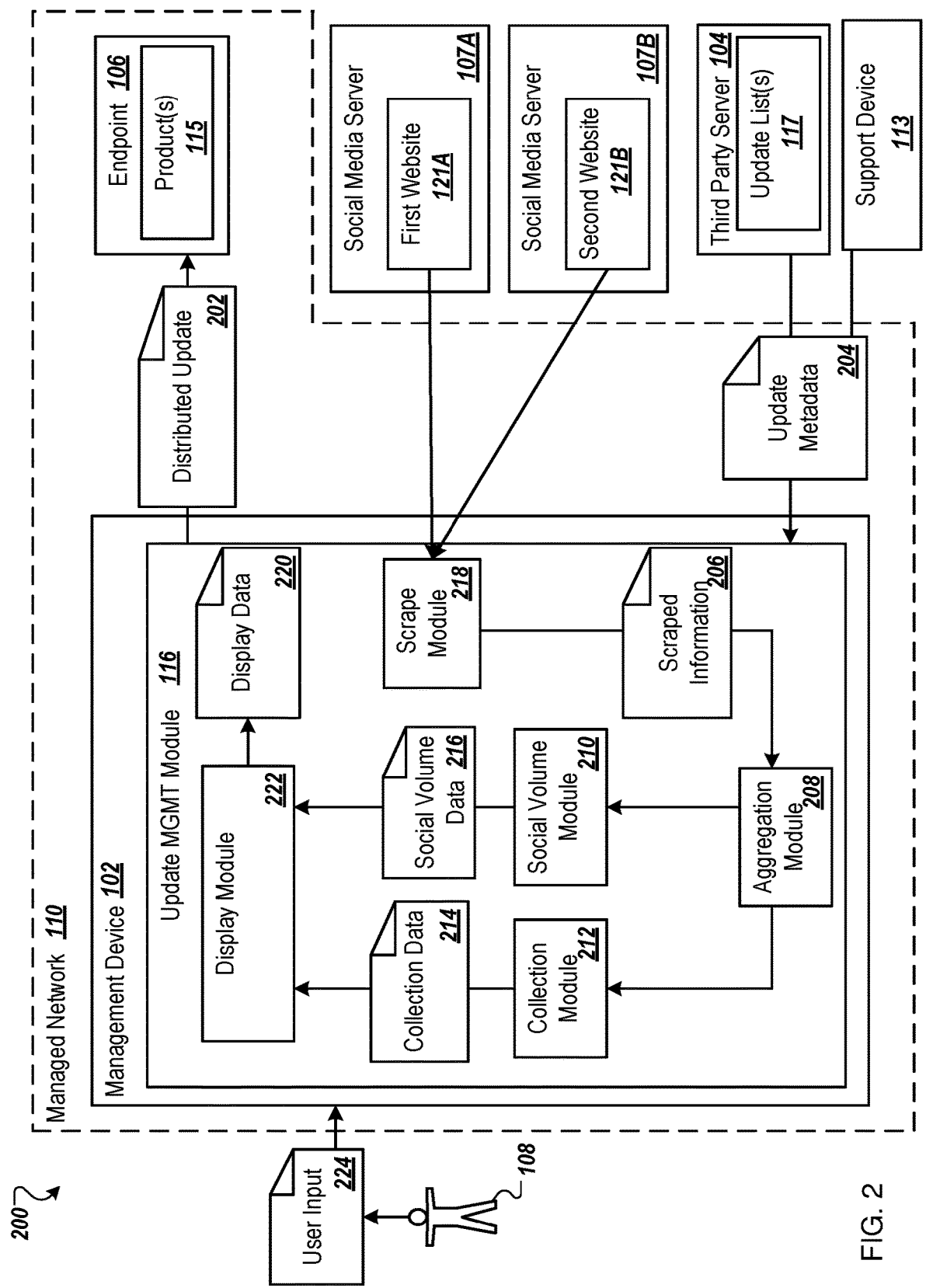
FIG. 2 depicts a block diagram of an example automated product update analysis process (analysis process) that may be implemented in the operating environment of FIG. 1.

FIG. 2 depicts a block diagram of an example automated product update analysis process (analysis process) 200 that may be implemented in the operating environment 100 of FIG. 1 or another suitable environment. The analysis process 200 of FIG. 2 may include one or more components (102, 104, 106, 107, 108, 110, 115, 117, 116, and 121) described with reference to FIG. 1. Although not depicted in FIG. 2, communication in the analysis process 200 may be via a network such as the network 120 of FIG. 1.

In the analysis process 200, update metadata 204 may be received by the management device 102. The update metadata 204 may be received from one or both of the third-party server 104 and the support device 113. For instance, third-party server 104 may be a server of an entity that publishes bulletins including the update metadata 204. The management device 102 may download the update metadata 204 from the third-party server 104. Additionally or alternatively, the support device 113 may review the bulletins of the third-party server 104. Based on the review, administrators of the support device 113 may communicate the update metadata 204 to the management device 102 or include the update metadata 204 in an update catalog (e.g., the update catalog 111 of FIG. 1). The update metadata 204 may include data that describes characteristics of one or more product updates. For instance, the update metadata may include an identifier or name of the product updates, dates of the bulletins, security level of the product updates, urgency of the product updates, threat level of the product updates, vendors of the product updates, applicable programs of the product updates, combinations thereof, or other data describing characteristics of the product updates.

The update metadata 204 may be processed by the update management module 116. For instance, the update metadata 204 or some portion thereof may be entered into a data storage architecture that may interface with a user interface. The user interface may be displayed to the administrator 108 to provide patch intelligence. An example of the user interface may be a user interface 300 described with reference to FIG. 3.

In some embodiments, the update metadata 204 may be related to a set of product updates that are released within a predetermined time of one another. For example, the update metadata 204 might be related to a group of patches released on a particular Patch Tuesday or all released during a second week of June in 2020, etc.

After the receipt of the update metadata 204, a scrape module 218 of the update management module 116 may be configured to scrape or automatically collect posts from the social media servers 107. The posts scraped from the social media servers 107 may be related to the product updates described in the update metadata 204.

In some embodiments, the scrape module 218 may implement an application programming interface (API) or another suitable data-access program that is configured to access the posts on the websites 121 on the social media servers 107. The API or the data-access program may enable entry of criteria that directs the scrape operation to particular posts. The criteria may include usernames, links, KB number, patch bulletin number, date, number of reposts, number of votes, number of likes, keywords in content of the posts, combinations thereof, or other suitable scrape criteria. For example, the social media server 107 may be a server operated by Twitter® and the website 121 may include a Twitter website (e.g., twitter.com). In this example, the scrape module 218 may implement a Twitter-scrape API (e.g., Tweepy API) to access posts from the Twitter website. The scrape module 218 may use a data identifier to focus the scrape operation to posts related to a patch update. For instance, the scrape module 218 may use the KB number to focus the scrape operation to posts related to a patch update having the KB number.

In the depicted embodiment, there are two social media servers 107A and 107B that host two websites 121A and 121B. The social media servers 107 may be separate and may be operated by separate, independent entities. The scrape module 218 may accordingly scrape posts from the two websites 121, which are independent from one another. In some embodiments, posts may be scraped from three or more social media servers 107.

The scrape module 218 may output scraped information 206 to an aggregation module 208. The scraped information 206 may include post information, post content, acceptance information such as rank information or repost information, combinations thereof, or other information included in the posts that is used to analyze product updates. Some examples of the post information, post content, and acceptance information are described with reference to FIGS. 4 and 5.

The aggregation module 208 may be configured to aggregate or combine the scraped information 206. The scraped information 206 originates at the two different websites 121. Accordingly, the scraped information 206 from posts on the first website 121A may be formatted differently from posts on the second website 121B. Additionally, the posts on the first website 121A might include different data and functionalities than the posts on the second website 121B. Thus, the aggregation module 208 may combine selected portions of the posts to enable analysis of the posts.

The aggregated post information may be communicated to a collection module 212 and a social volume module 210. The social volume module 210 may be configured to quantify a social volume from the aggregated post information. The social volume is a measure of discussion related to one or more of the product updates described in the update metadata 204. In some embodiments, the social volume module 210 may be configured to blend two or more acceptance information types. The acceptance information may generally indicate a degree to which users of the website 121 accept, support, or propagate the post. For instance, the posts from the first website 121A might include a repost functionality. In these embodiments, the acceptance information may include a repost number that indicates a number of times the post has been reposted. The posts from the second website 121B might include as vote functionality that allows users to rank the posts. In these embodiments, the acceptance information may include rank information. These different types of acceptance information may not directly add to one another. Accordingly, the social volume module 210 may blend different types of acceptance information (e.g., combine and/or weight the rank information with the repost information). In some embodiments, other types of acceptance information may be blended to quantify a social volume. For instance, a number of likes, a number of comments, contents of the comments, a number of shares, etc. may be used as acceptance information and may be blended by the social volume module 210 to quantify the social volume data 216.

In some embodiments, the social volume module 210 may filter non-informational content. For instance, responsive to a first portion of the content including no relevant discussion of the product update, the first portion may be filtered from the content. The filtered content may also be disregarded during quantification of the social volume.

In some embodiments, the social volume module 210 may be quantified relative to social volumes of other product updates. For instance, the social volume module 210 may be quantified relative to other product updates that are released during a particular time period. To quantify the social volume relative to other product updates, the social volume may be normalized relative to other social volumes for other product updates. Normalization may include application of a normalization operation to the social values. Normalization may remove units from the data and/or rescale the social volumes. Other normalization operations may be implemented such that each of the social volumes can be viewed in relationship to the social volumes of the social volumes of other/additional product updates instead of as a simple value.

In some embodiments, the social volume module 210 may be configured to rank the social volumes. For example, a social volume of a first product update may be ranked relative to the social volumes of additional product updates.

The rank of the social volumes may correlate to an icon that represents the social volume of a product update. A state of the icon may change based on the rank of the social volume. For instance, in some embodiments, the rank operation may be based on a percentile in which the social volume falls relative to other social volumes. With combined reference to FIGS. 2 and 3, an example icon is depicted as item labelled 320. The item includes a set of four bars, which may correlate to five percentile bins. Responsive to the social volume falling in a first percentile, the icon 320 may display four empty bars. Similarly, responsive to the social volume falling in a third percentile, two of the four bars may be filled, and two of the four bars may be empty.

In some embodiments, the rank operation may be performed according to a K-means clustering or another suitable clustering operation. Clusters determined during the K-means clustering operation may correlate to configurations of the icon 320. For instance, a first cluster determined during the K-means clustering operation may correspond to all four bars being filled, while other clusters may correspond to other particular configurations of the icon 320.

Referring back to FIG. 2, the social volume module 210 communicate social volume data 216 to a display module 222. The display module 222 may be configured to generate display data 220 and cause display of an indication of the social volume such as the icon 320 of one or more product updates.

The indication of the social volume may be displayed prior to implementation of the product updates. The indication of the social volume may be displayed with other data related to the product updates. The indication of the social volume may be displayed in a user interface such as the user interface 300 described elsewhere in the present disclosure.

A collection module 212 may also receive aggregated post information. The collection module 212 may be configured to extract content from the aggregated post information. The content may include substantive portions of the posts.

In some embodiments, the collection module 212 may filter non-informational content. For instance, responsive to a first portion of the content including no relevant discussion of the product update, the first portion may be filtered from the content.

Based on the extracted content, the collection module 212 may summarize the content. The content may be summarized into a collection of terms or phrases that are representative of a topic of the posts. In some embodiments, the collection module 212 may use a natural language processing (NLP) operation to summarize the content. The NLP operation may be a supervised or an unsupervised methodology that may be implemented to model the topic of the posts. For instance, the NLP operation might include a graph-based ranking operation such as TextRank. In other embodiments, the NLP operation may include a Latent Dirichlet Allocation operation.

Collection data 214 may be communicated from the collection module 212 to the display module 222. The display module 222 may be configured to generate display data 220 and cause display of the collection of one or more product updates. The collection may be optionally visible in a user interface such as the user interface 300 described elsewhere in the present disclosure.

In some embodiments, the indication of the social volume and of the collection may be displayed prior to implementation of the product updates. The indication of the social volume and the collection may assist the administrator 108 in a decision on when or whether to implement the first product update. For example, in some embodiments, the indication of the social volume and of the collection may be displayed to the administrator 108. Following review, the administrator 108 may provide user input 224 to the update management module 116. Responsive to the user input 224, the update management module 116 may distribute the patch updates, which is depicted as a distributed update or update 202 in FIG. 2.

Additionally or alternatively, the collection data 214 and the social volume data 216 may be used to automatically determine when the product updates are distributed to the endpoint 106. The collection data 214 and/or the social volume data 216 may be used as a basis of automated distribution of the distributed patch to the endpoint 106. For instance, responsive to the social volume data 216 indicating a low level of discussion on the websites 121, the update management module 116 may communicate the distributed update 202. Additionally, responsive to a low level of discussion on the websites 121 and a security characteristic of the patch update being critical, the update management module 116 may communicate the distributed update 202. Likewise, the update management module 116 may not distribute the patch updates responsive to high levels of social volume or may require the user input 224 to distribute the patch update responsive to high levels of social volume.

The operations above of the analysis process 200 may be repeated one or more times prior to distribution of the patch updates. For instance, the above operations may occur once, which may result in an initial indication of the social volume and the collection being displayed. After a particular time period (e.g., one day or another suitable time period) or after a particular event (e.g., receipt of additional metadata), the scrape module 218 may re-scraping the websites 121 for additional posts regarding the product update. The additional posts may be the basis of updated social volumes that reflects changes to a previously quantified social volume and an updated collection, which reflect changes to previously quantified collection. The display module 222 may cause display of an updated indication of the social volume and an updated collection.

The above operations of the analysis process 200 may repeat two or more times and may be performed according to an interval for a particular period of time. For instance, the analysis process 200 may be conducted every day for thirty (30) days, sixty (60) days, ninety (90) days or another suitable time period following publication of a bulletin that includes the update metadata 204.

The update management module 116 may communicate the distributed update 202 for implementation at the endpoint 106. Implementation of the distributed update 202 may include code changes that are executed or incorporated at the product 115. The distributed update 202 modifies a portion of a code that makes up the application such that at least one functionality of the application changes following implementation.

In some embodiments, the update management module 116 may be configured to perform additional analysis of the collection data 214. For example, the update management module 116 may be configured to determine whether the topic is a problem with implementation of the corresponding product update. Responsive to the topic being a problem, the update management module 116 may review the contents to identify a link to a solution to the problem or another disclosure of the solution. The update management module 116 may cause display of the link or may otherwise publish the solution in a user interface.

Figure 3:
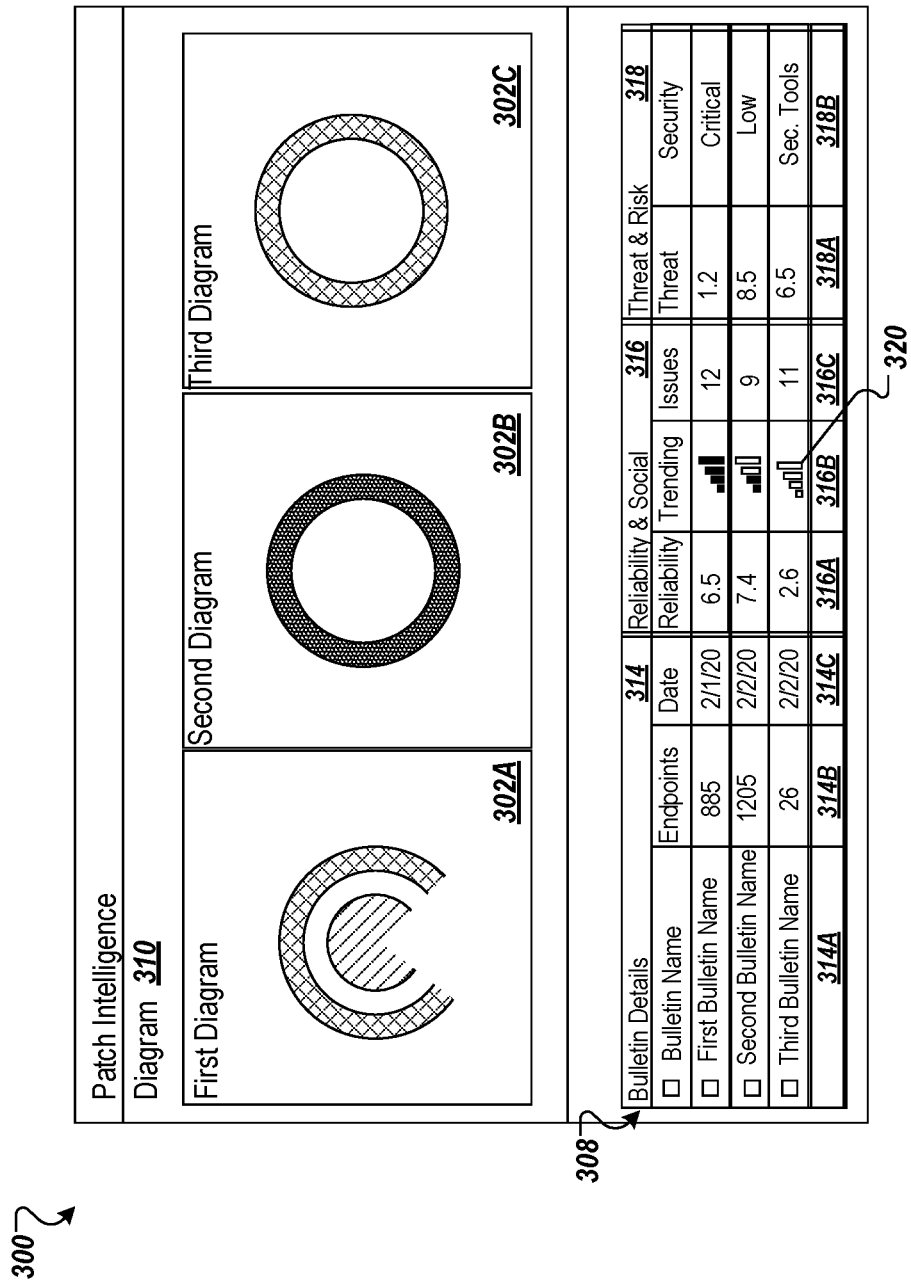
FIG. 3 depicts a block diagram of an example user interface that may be implemented in the operating environment of FIG. 1 and the analysis process of FIG. 2.

FIG. 3 depicts a block diagram of an example user interface 300 that may be implemented in the operating environment 100 of FIG. 1 or another suitable environment. The user interface 300 may be configured to display information regarding analysis of product updates. For instance, the user interface 300 may display an indication of the social volume and/or the collection. The user interface 300 may enable visibility to such information as well as provide visibility when changes occur. Additionally, the user interface 300 may display the indication of social volume (in FIG. 3, labelled 316B) in context with other data related to patch updates.

In the depicted embodiment, the user interface 300 is configured as a patch intelligence interface. Patch intelligence generally refers to a system that aggregates and displays information that assists in management of product updates and their distribution to endpoints of a managed network. For instance, with combined reference to FIGS. 2 and 3, the user interface 300 may be implemented in the update management module 116 or by the management device 102. The user interface 300 may display information to the administrator 108. Based at least partially on the information in the user interface 300, the update management module 116 may distribute the update 202 to the endpoint 106. The endpoint 106 may receive the update 202 where it is implemented relative to the product 115. Implementation of the update 202 results in code changes to the product 115. Thus, the management device 102 may distribute the update 202 based on the information in the user interface 300. Additionally or alternatively, the user interface 300 may receive the user input 224 from the administrator 108. Responsive to the user input 224, the update management module 116 may distribute the update 202 to endpoints 106.

Referring back to FIG. 3, the user interface 300 is based on bulletins, which may correspond to update lists 117 of FIGS. 1 and 2. Bulletins are announcements of product updates that may be communicated by a vendor or a third-party. The user interface 300 includes a diagram portion 310 and a bulletin-data portion 308. The diagram portion 310 includes diagrams 302A, 302B, and 302C (generally, diagram 302 or diagrams 302). The diagrams 302 include graphic information regarding the bulletins or recommended product updates and application of the bulletins to products on endpoints. Some examples of the diagrams 302 include divisions of vendors or applications to which product updates apply, security levels of recommended product updates, endpoints with known vulnerabilities (e.g., deficient a product update), and the like.

The bulletin-data portion 308 is a table of data and information that relates to each product update that has been described in one of the bulletins. The bulletin-data portion 308 might include metadata related to product updates as well as product update analysis information. For instance, the metadata may include information included in the update lists (e.g., 117 of FIGS. 1 and 2) and from the managed network 110. The product update analysis information may be based on data scraped from third-party websites such as the social media servers 107 of FIGS. 1 and 2 and other sources. The bulletin-data portion 308 is separated into three groups, namely bulletin details 314, reliability and social 316, and threat and risk 318. Other information and data may be included in the bulletin-data portion 308 and the information of the bulletin-data portion 308 may be organized in any suitable way.

The bulletin details 314 include a bulletin names column 314A. The bulletin names column 314A identify a particular product update by a serial number (e.g., a KB number, a CVE number, or a vendor number) assigned to it. Data related to each of product updates, which are identified by the bulletin names column 314A, are displayed across a corresponding row.

For each of the patch updates several types of data are provided. In the depicted embodiment, a number of affected endpoints is displayed in an endpoint column 314B, a date of the bulletin is displayed in a date column 314C, a reliability of the product update is displayed in a reliability column 316A, a social volume of the product update is displayed in a trending column 316B, a number of issues associated with the product update is displayed in a issues column 316C, a threat level of the product update is displayed in a threat column 318A, and a security level of the product update may be displayed in a security column 318B.

In the trending column 316B, the icon 320 represents the social volume. The icon 320 is a set of bars with increasing heights when viewed from left to right in FIG. 3. As the social volume of a product update increases, bars in the set of bars may change from unfilled to a filled state. For instance, the icon 320 associated with the product update having a third bulletin name includes empty bars, which may indicate low social volume. The icon 320 associated with the product update having a second bulletin name includes two filled bars and two empty bars, which may indicate a medium social volume. The icon 320 associated with the product update having a first bulletin name includes four filled bars, which may indicate a high social volume. The icon 320 changes as social volumes of the product updates change. For instance, a change from a low social volume to a medium social volume may be reflected in filling two bars of the icon 320.

In some embodiments, selection of the icon 320 may result in display of additional information. For instance, selection of the icon 320 may result in display of the collection that applies to a corresponding product update. An administrator (e.g., 108 of FIGS. 1 and 2) may select the icon 320 related to the product update having the first bulletin name. Selection of the icon 320 may result in display of the collection that are related to the product update. In some embodiments, the collection may be displayed responsive to selection of another icon or value in the bulletin-data portion 308. The collection may be displayed as one of the diagrams 302 of the diagram portion 310.

Additionally, in some embodiments, selection of the icon 320 to display the collection is related to a state of the icon 320. For instance, in circumstances in which the bars are empty, which indicates a low social volume, the collection display may be disabled. The collection display may be disabled because a low social volume may be unreliable and provide disinformation to an administrator or a management system. Similarly, when the icon 320 indicates medium and/or high social volume, the display of the collection may be enabled.

Figure 4:
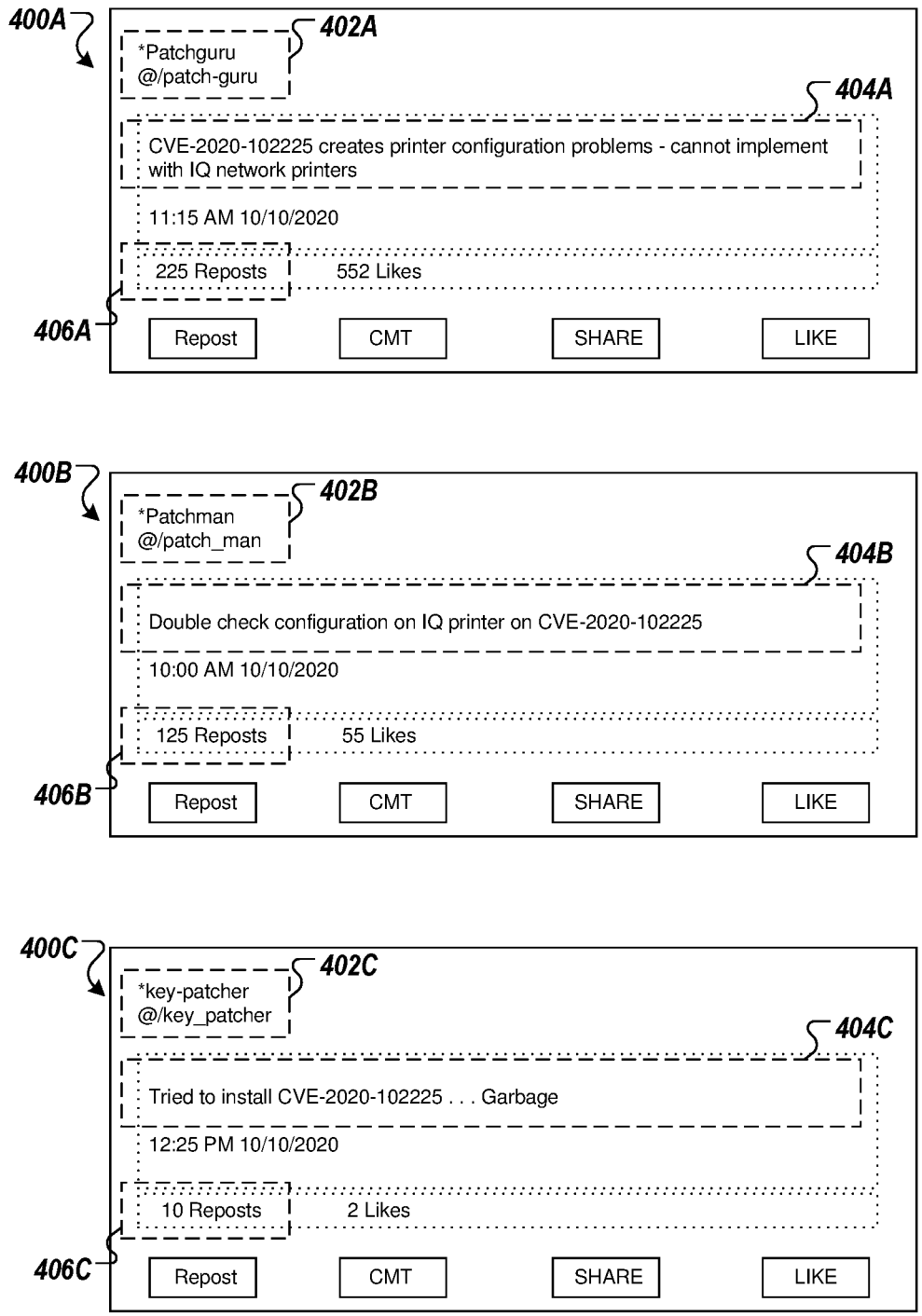
FIG. 4 depicts block diagrams of example posts that may be scraped in the operating environment of FIG. 1 and the analysis process of FIG. 2.

FIG. 4 depicts block diagrams of example posts 400A-400C (generally, post 400 or posts 400), which may be scraped in the operating environment 100 of FIG. 1 or another suitable environment. For example, with combined reference to FIGS. 2 and 4, the posts 400 may be examples of posts that are scraped from the first website 121A of the social media server 107A of FIG. 2.

The posts 400 include information that may be relevant to the product update analysis. In particular, the posts 400 may provide feedback regarding characteristics of a product update from actual users, who may have implemented the product update. In some circumstances, the actual users who publish the posts 400 may be experts in the field of the patch management or cyber-vulnerability management. Additionally, the users who publish the posts 400 may be considered "early adopters" in the field of patch management and cyber-vulnerability management. Accordingly, the posts 400 may provide valuable insight and feedback to administrators of a managed network such as the managed network 110. For example, the posts 400 might indicate that there is a problem with the product update (e.g., the product update causes an endpoint to crash, the product update disables some functionality, etc.), a particular configuration required for the patch update, the product update is necessary to prevent a cyber-vulnerability, the product update works properly, and the like.

The posts 400 may include information used to quantify the social volume and to generate the collection that are representative of the topics of the posts 400. For instance, the posts 400 of FIG. 4 include post information 402A-402C, post content 404A-404C, and repost information 406A-406C.

The post information 402A-402C (generally, post information 402) may include an identity information of a user and/or a username of an individual or entity who is publishing the posts 400. For instance, in a second post 400B, a second post information 402B includes "*Patchman" which is provided as a simple example. The second post information 402B may indicate that the second post 400B is published by an individual who has a username "patchman." Additionally, an address of the user may be included in the post information 402. For instance, in the second post 400B, the second post information 402B includes "@/patch-man," which may be a network address of the user having the username "patchman."

In the embodiments, scraping a web site may include anonymizing the posts to remove the post information 402. The anonymizing the posts 400 may be performed prior to review a management device such as the management device 102.

The post contents 404A-404C (generally, post contents 404) may include the substance of the posts 400. The post contents 404 may include key terms such as a patch identifier (e.g., CVE-2020-102225) that is used in a scraping operation to determine which posts 400 are related to a patch update having the patch identifier. For example, during analysis of a patch update having a patch identifier "CVE-2020-102225" the scraping operation may scan for posts (e.g., 400) that include the corresponding patch identifier in the post contents 404.

Additionally, the post contents 404 may be extracted. The post contents 404 may be extracted, combined with content from other posts 400, and summarized to provide to an administrator of a product update management system feedback regarding the product update. For instance, in some embodiments the post contents 404 may be summarized to generate a collection. Some additional details of an example collection generation process are provided with reference to FIG. 6.

The repost information 406A-406C (generally, repost information 406) may indicate a popularity or acceptance of the post 400. In the depicted posts 400, the repost information 406 includes a number of times the post 400 was re-posted on another user's feed. For instance, other users may read the post 400 and select a repost button which indicates the publishes the post 400 on the other user's feed.

The repost information 406 may be used to quantify the social volume of a product update. The repost information 406 may be blended with other information such as a rank information (506 of FIG. 5) to quantify the social volume of a product update.

In addition, in some embodiments, the repost information 406 may be used to determine whether the post 400 includes reliable feedback. For instance, posts 400 have fewer than a threshold number of reposts (e.g., 25, 30, 50 or another suitable number of reposts) may be disregarded.

In some embodiments, other acceptance information may be used to quantify social volume in addition to the repost information 406 or instead of the repost information 406. For instance, the social volume may be quantified based on a number of comments, a number of times the post 400 is shared, a number of times a post 400 is liked, or some combination thereof. Similar to the blending the other types of acceptance information may be combined with repost information 406 from posts from other websites to quantify the social volume.

Figure 5:
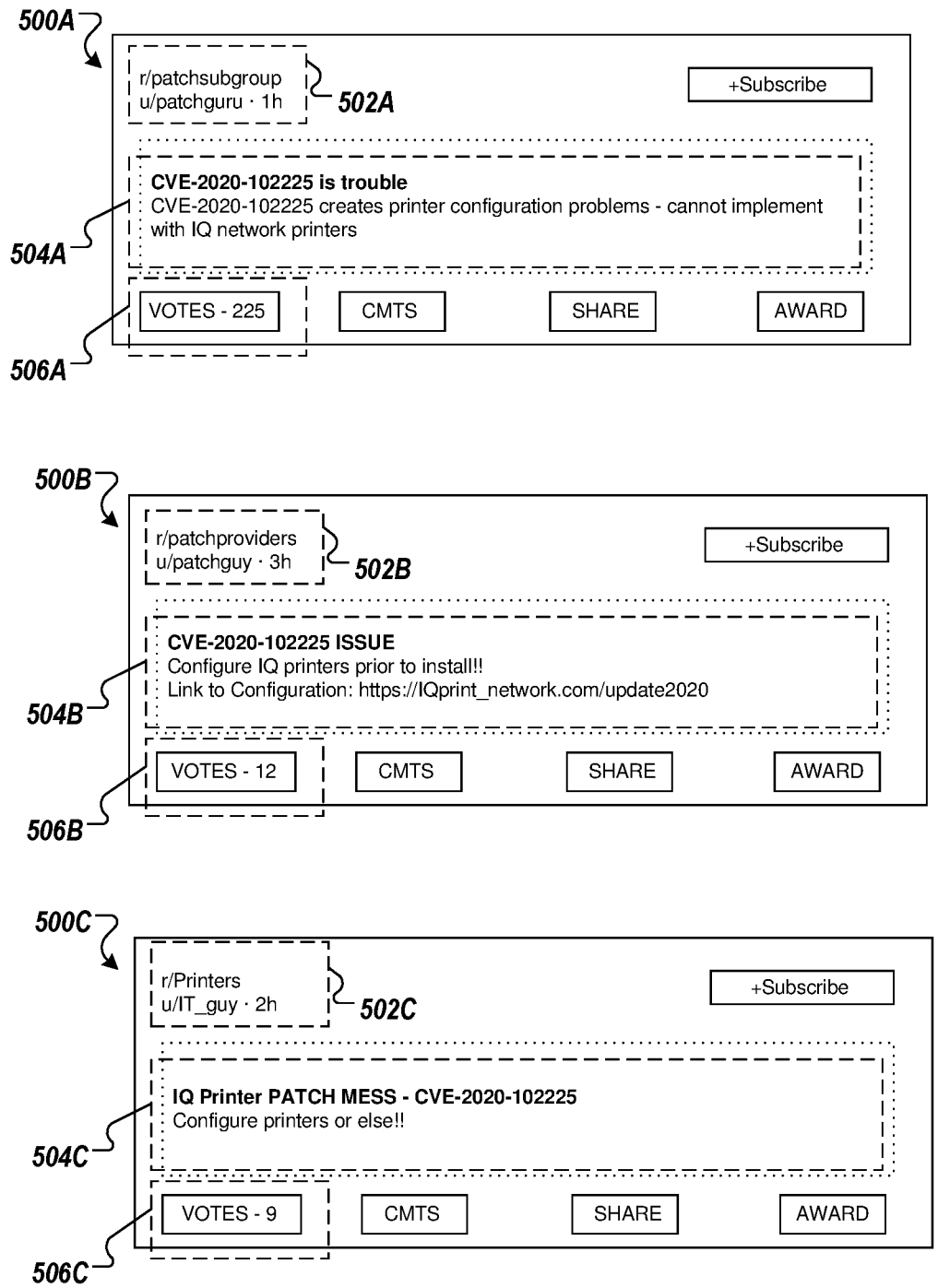
FIG. 5 depicts block diagrams of example posts that may be scraped in the operating environment of FIG. 1 and the analysis process of FIG. 2.

FIG. 5 depicts block diagrams of example posts 500A-500C (generally, post 500 or posts 500), which may be scraped in the operating environment 100 of FIG. 1 or another suitable environment. For example, with combined reference to FIGS. 2 and 5, the posts 500 may be examples of posts that are scraped from the second website 121B of the social media server 107B of FIG. 2.

The posts 500 are similar to the posts 400 described with reference to FIG. 4. For instance, the posts 500 include information that may be relevant to the product update analysis and may provide feedback regarding characteristics or a product update from actual users, who may be experts in the field of the patch management or cyber-vulnerability management. As described above, the posts 500 might indicate that there is a problem with the product update, a particular configuration required for the patch update, the product update is necessary to prevent a cyber-vulnerability, the product update works properly, and the like.

Additionally, similar to the posts 400, the posts 500 may include information used to quantify the social volume and to generate a collection of terms and phrases that are representative of the topics of the posts 500. For instance, the posts 500 include post information 502A-502C, post content 504A-504C, and rank information 506A-506C.

The post information 502A-502C (generally, post information 502) may include an identity of a group or sub-forum to which the posts 500 are published. For instance, in a first post 500A, a first post information 502A includes "r/patch-subgroup," which is provided as a simple example. The first post information 502A might indicate that the first post 500A is published in a sub-forum called "patchsubgroup." In the embodiments, scraping a website may include identifying one or more sub-forums from which relevant and useful posts 500 may be found. Moreover, the post information 502 may be recorded to improve efficiency of a scraping process.

Similarly, the post information 502 a username of an individual who is publishing the posts 500. For instance, in a second post 500B, a second post information 502B includes "u/patchguy," which is provided as a simple example. The second post information 502B may indicate that the second post 500B is published by an individual who has a username "patchguy." In the embodiments, scraping a website may include anonymizing the posts 500 to remove a portion of the post information 502 related to the individual. The anonymizing the posts 500 may be performed prior to review a management device such as the management device 102.

The post contents 504A-504C (generally, post contents 504) may include the substance of the posts 500. For example, the post contents 504 may include a title (which is depicted in bold) as well as a substantive portion of the posts 500. The post contents 504 may include key terms such as a patch identifier (e.g., CVE-2020-102225) that is used in a scraping operation to determine which posts 500 are related to a patch update having the patch identifier. For example, during analysis of a patch update having a patch identifier "CVE-2020-102225" the scraping operation may scan for posts (e.g., 500) that include the corresponding patch identifier in the post contents 504.

Additionally, the post contents 504 may be extracted. The post contents 504 may be extracted and summarized to provide to an administrator of a product update management system feedback regarding the product update. For instance, in some embodiments the post contents 504 may be summarized to generate the collection. Some additional details of an example collection generation process are provided with reference to FIG. 6.

In some embodiments, some of the post contents 504 may be disregarded. For instance, some of the post contents 504 may be regarded as non-informational. A determination of whether the post contents 504 are non-informational may be based on a length of the post contents 504 (e.g., fewer than four or another suitable number of words), may be based on whether the post contents 504 include specific words indicating that the post 500 includes a review that is absent any useful information, or may be based on a reaction or a lack of reaction to the post by other users. In some embodiments, a determination of whether the post contents 504 are non-informational may be performed during a summarization operation.

The rank information 506A-506C (generally, rank information 506) may indicate a popularity or acceptance of the post 500. In the depicted posts 500, the rank information 506 includes a number of votes the post 500 receives. For instance, other users may read the post 500 and select a vote button which indicates the user's support or agreement. The more votes a post 500 has received, a higher the post 500 is displayed on the web site.

The rank information 506 may be used to quantify the social volume of a product update. The rank information 506 may be blended with other information such as a repost information (406 of FIG. 4) to quantify the social volume of a product update.

In addition, in some embodiments, the rank information 506 may be used to determine whether the post 500 includes reliable feedback. For instance, posts 500 have fewer than a threshold number of votes (e.g., 25, 30, 50 or another suitable number of votes) may be disregarded.

In some embodiments, the rank information 506 may be based on other types of information of the posts 500. For instance, the rank information 506 may be based on a number of comments, a number of times the post 500 is shared, a number of times a post receives an award, or some combination thereof. Similar to the blending described above, the other types of rank information may be combined with repost numbers from posts from other websites to quantify the social volume.

Figure 6:
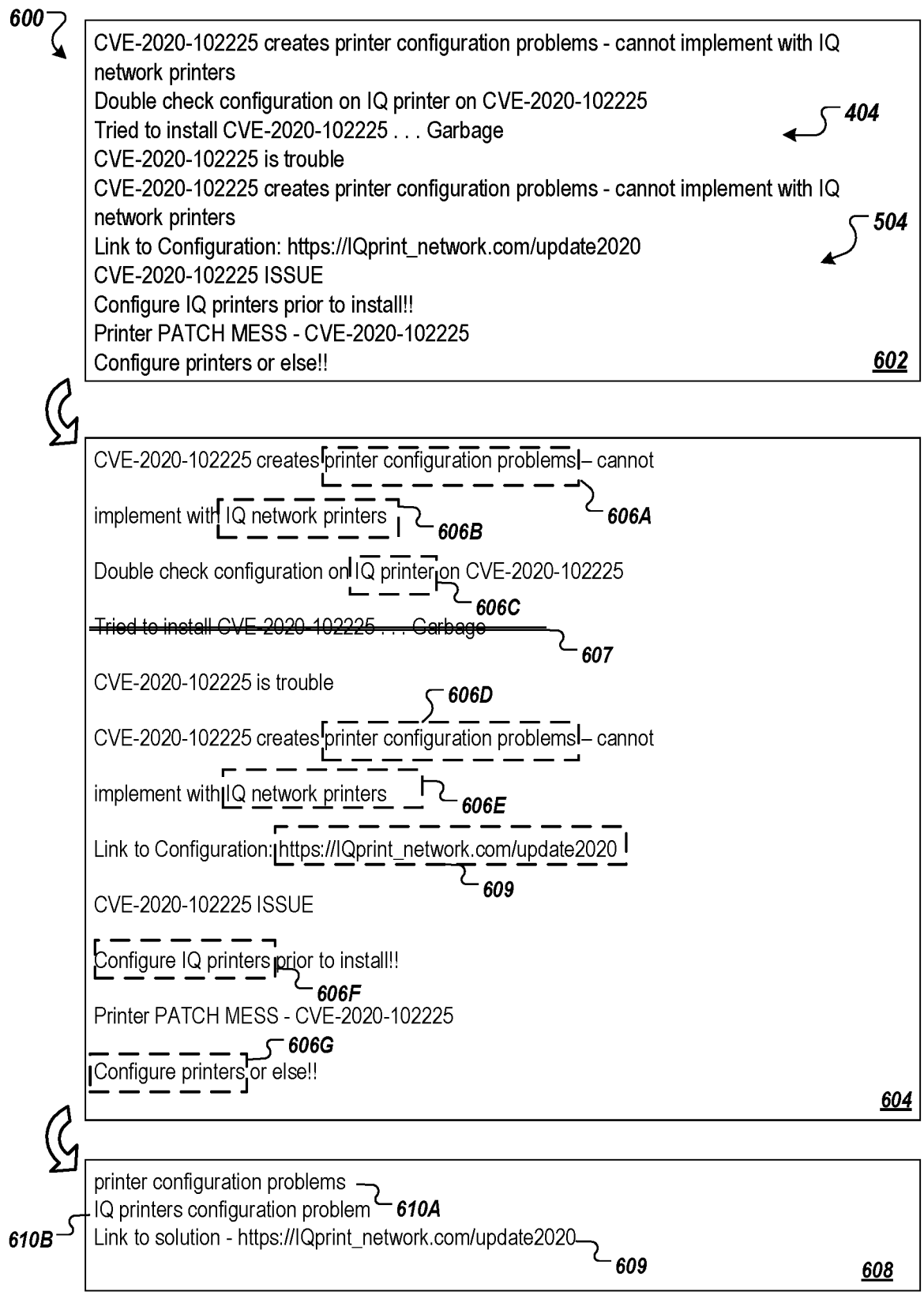
FIG. 6 depicts a block diagram representative of collection generation process that may be implemented in the operating environment of FIG. 1 and the analysis process of FIG. 2.

FIG. 6 depicts a block diagram representative of collection generation process 600 that may be implemented in the operating environment 100 of FIG. 1 or another suitable environment. The collection generation process 600 may be incorporated in another process such as the analysis process 200 described elsewhere in the present disclosure. Additionally, the collection generation process 600 of FIG. 6 is described using the posts 400 of FIG. 4 and the posts 500 of FIG. 5. For example, the content 404 and 504 of the posts 400 and 500 are included in the collection generation process 600. With the benefit of this disclosure, one with skill in the art may understand that the content 404 and 504 described in FIG. 6 is a non-limiting example. The content of posts may vary, and collections of terms and phrases may be generated from any suitable content from posts.

FIG. 6 includes a first set of extracted data (first set) 602. The first set 602 includes data representative of the content, which may be extracted from posts. In the example of FIG. 6, the first set 602 includes the contents 404 and 504 of the posts 400 and 500 from FIGS. 4 and 5. Extraction of the context may be performed by the update management module 116 or another suitable system. The contents 404 and 504 may be extracted from aggregated posts such that the contents of posts 400 and 500 from two or more websites may be extracted and combined in the first set 602. The data in the first set 602 may be representative of the contents 404 and 504 prior to any analysis.

FIG. 6 may also include a second set of extracted data (second set) 604. In the second set 604, the data from the first set 602 may be at least partially processed. The data from the first set may be processed using one or more NLP operations to model the topic of the posts and summarize the contents 404 and 504. The NLP operations may be a supervised or an unsupervised methodology. For instance, the NLP operation might include a graph-based ranking operation or a Latent Dirichlet Allocation operation.

In some embodiments, in the second set 604 a graph-based ranking operation or another NLP operation may be used to identify important portions 606A-606G (generally, important portion 606 or important portions 606). The important portions 606 are identified in FIG. 6 by dashed boxes. The important portions 606 may related to the topics described in the contents 404 and 504. For instance, a first important portion 606A may include text "printer configuration problems." The first important portion 606A may be identified based on inclusion of the terms "printer" and "problems" within a vicinity of one another along with additional processing performed using the NLP operation.

Additionally, in some embodiments, the non-informational portions 607 may be identified. The non-informational portions 607 may be identified based on presence of particular terms that indicate an opinion is provided without supporting information. Some examples of the terms may include "great," "garbage," "good," "sucks," and the like. Based on identified important portions 606, a collection 608 may be generated. The collection 608 may include terms and phrases 610A and 610B (generally, phrase or phrases 610). The phrases 610 may be representative of the topics of the content 404 and 504. The phrases 610 may be generated by combining and editing the important portions 606 of the second set 604.

In some embodiments, the contents 404 and 504 may be further analyzed. For instance, in some embodiments, the contents 404 and 504 may be analyzed to determine whether the posts (e.g., 400 and 500) are indicative of a problem or issue with the incorporation or implementation of a first product update. For instance, in the second set 604, there are instances of the terms "problems," "mess," and "issue." Accordingly, it may be determined that there is a problem associated with the product update.

Responsive to a determination that the posts are indicative of a problem, a solution 609 may be identified. For instance, the solution may take the form of a link to an explanation, a set of code, a link to a set of code, etc. In these and other embodiments, the solution 609 may be included in the collection 608 or otherwise conveyed to an administrator. Selection of the solution 609 may enable access to a set of code, an explanatory page, a help desk administrator interface, and the like. Additionally or alternatively, a link to the solution 609 may be accessed which may implement the solution 609.

Figure 7:
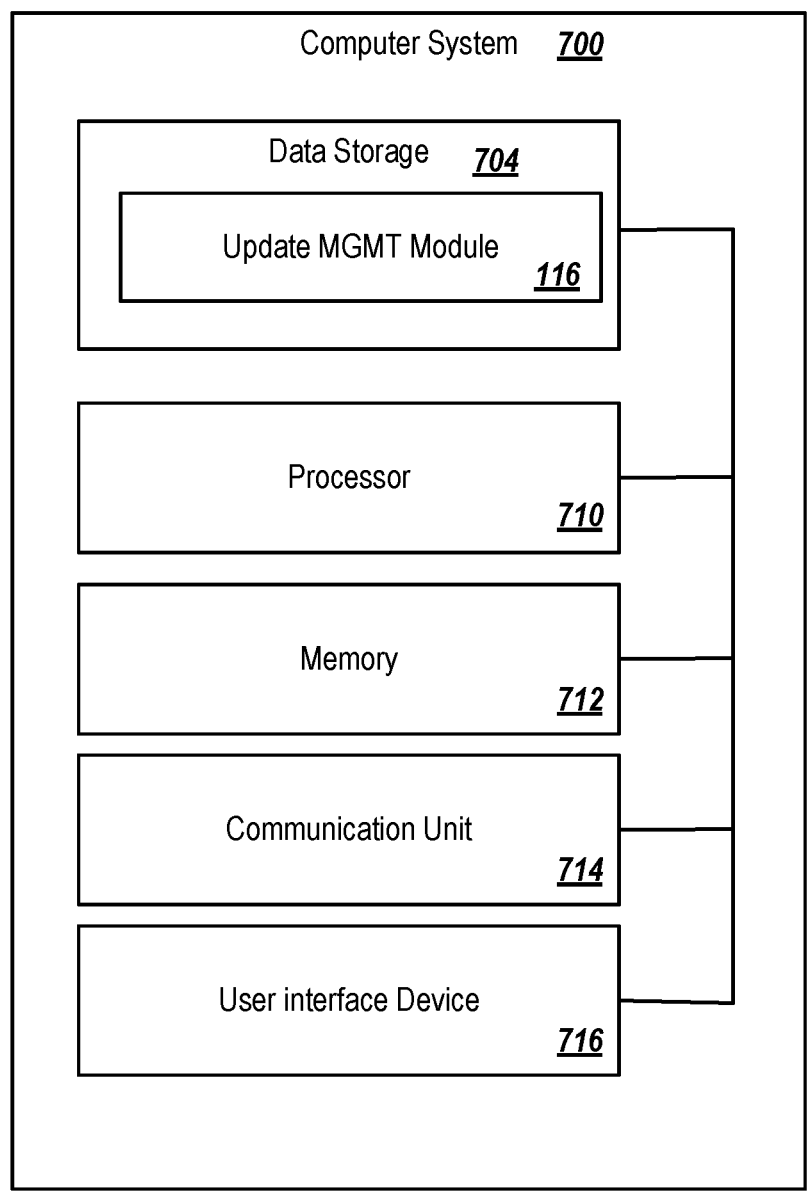
FIG. 7 illustrates an example computer system configured for automated product update analysis and management.

FIG. 7 illustrates an example computer system 700 configured for automated product update analysis and management, according to at least one embodiment of the present disclosure. The computer system 700 may be implemented in the operating environment 100 of FIG. 1, for instance. Examples of the computer system 700 may include the management device 102, the endpoint 106, the third-party server 104, the distribution server 112, the support device 113, the social media servers 107, or some combination thereof. The computer system 700 may include one or more processors 710, a memory 712, a communication unit 714, a user interface device 716, and a data storage 704 that includes the update management module 116.

The processor 710 may include any suitable special-purpose or general-purpose computer, computing entity, or processing device including various computer hardware or software modules and may be configured to execute instructions stored on any applicable computer-readable storage media. For example, the processor 710 may include a microprocessor, a microcontroller, a digital signal processor (DSP), an ASIC, an FPGA, or any other digital or analog circuitry configured to interpret and/or to execute program instructions and/or to process data. Although illustrated as a single processor in FIG. 7, the processor 710 may more generally include any number of processors configured to perform individually or collectively any number of operations described in the present disclosure. Additionally, one or more of the processors 710 may be present on one or more different electronic devices or computing systems. In some embodiments, the processor 710 may interpret and/or execute program instructions and/or process data stored in the memory 712, the data storage 704, or the memory 712 and the data storage 704. In some embodiments, the processor 710 may fetch program instructions from the data storage 704 and load the program instructions in the memory 712. After the program instructions are loaded into the memory 712, the processor 710 may execute the program instructions.

The memory 712 and the data storage 704 may include computer-readable storage media for carrying or having computer-executable instructions or data structures stored thereon. Such computer-readable storage media may include any available media that may be accessed by a general-purpose or special-purpose computer, such as the processor 710. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 710 to perform a certain operation or group of operations.

The communication unit 714 may include one or more pieces of hardware configured to receive and send communications. In some embodiments, the communication unit 714 may include one or more of an antenna, a wired port, and modulation/demodulation hardware, among other communication hardware devices. In particular, the communication unit 714 may be configured to receive a communication from outside the computer system 700 and to present the communication to the processor 710 or to send a communication from the processor 710 to another device or network (e.g., the network 120 of FIG. 1).

The user interface device 716 may include one or more pieces of hardware configured to receive input from and/or provide output to a user. In some embodiments, the user interface device 716 may include one or more of a speaker, a microphone, a display, a keyboard, a touch screen, or a holographic projection, among other hardware devices.

The update management module 116 may include program instructions stored in the data storage 704. The processor 710 may be configured to load the update management module 116 into the memory 712 and execute the update management module 116. Alternatively, the processor 710 may execute the update management module 116 line-by-line from the data storage 704 without loading them into the memory 712. When executing the update management module 116, the processor 710 may be configured to perform one or more processes or operations described elsewhere in this disclosure.

Modifications, additions, or omissions may be made to the computer system 700 without departing from the scope of the present disclosure. For example, in some embodiments, the computer system 700 may not include the user interface device 716. In some embodiments, the different components of the computer system 700 may be physically separate and may be communicatively coupled via any suitable mechanism. For example, the data storage 704 may be part of a storage device that is separate from a device, which includes the processor 710, the memory 712, and the communication unit 714, that is communicatively coupled to the storage device. The embodiments described herein may include the use of a special-purpose or general-purpose computer including various computer hardware or software modules, as discussed in greater detail below.

Figure 8A:
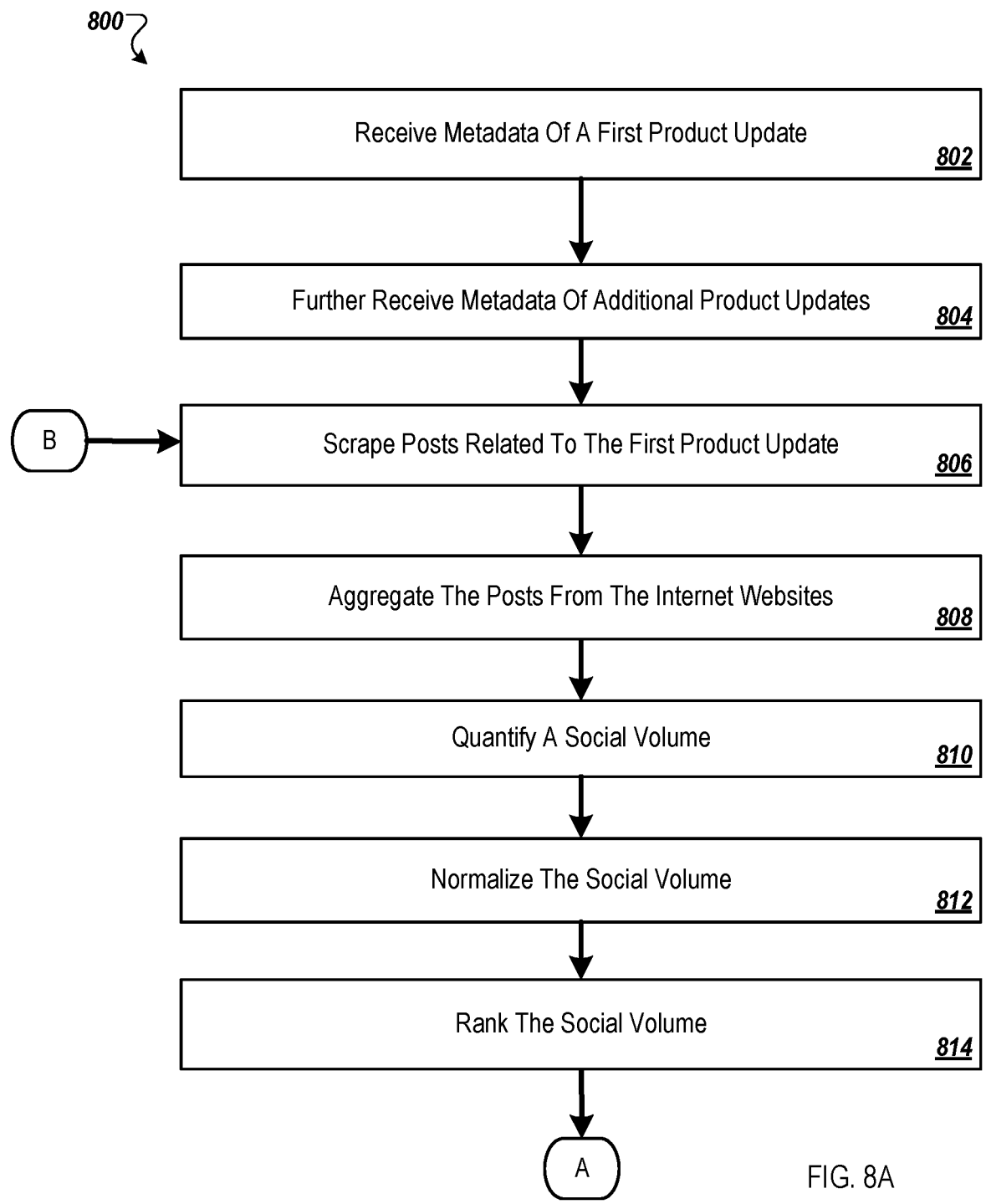
FIGS. 8A and 8B are a flow chart of an example method of automated product update analysis and management, all according to at least one embodiment described in the present disclosure.
Figure 8B:
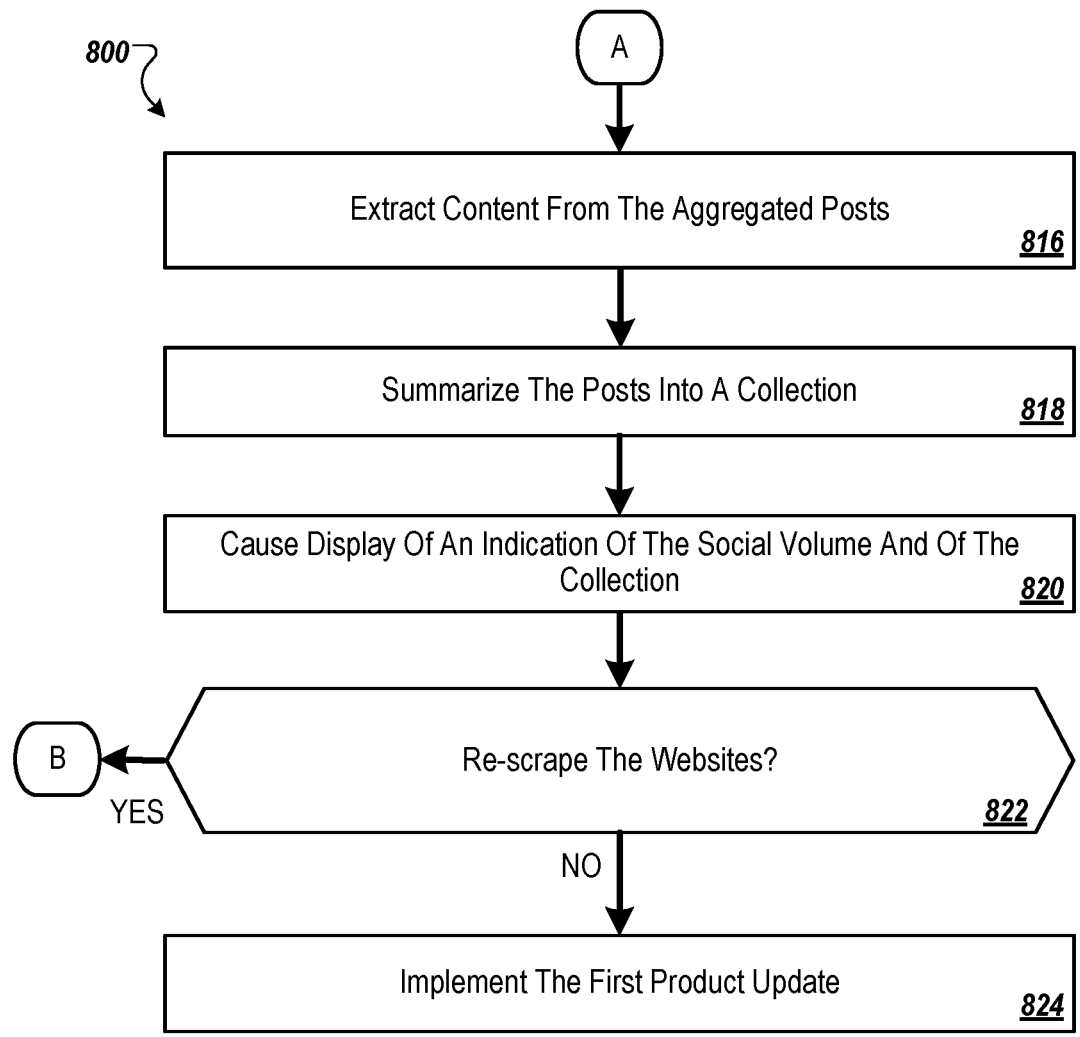

FIGS. 8A and 8B are a flow chart of an example method 800 of automatic product update analysis and management, according to at least one embodiment of the present disclosure. As described elsewhere in the present disclosure, the method 800 may involve or may be based on third-party feedback information (e.g., posts) from social media websites. The method 800 may be performed in a suitable operating environment such as the operating environment 100 or the managed network 110 of FIG. 1. The method 800 may be performed by the management device 102 described elsewhere in the present disclosure or by another suitable computing system, such as the computer system 700 of FIG. 7. In some embodiments, the management device 102 or the other computing system may include or may be communicatively coupled to a non-transitory computer-readable medium (e.g., the memory 712 of FIG. 7) having stored thereon programming code or instructions that are executable by one or more processors (such as the processor 710 of FIG. 7) to cause a computing system or the management device 102 to perform or control performance of the method 800. Additionally or alternatively, the management device 102 may include the processor 710 that is configured to execute computer instructions to cause the management device 102 or another computing systems to perform or control performance of the method 800. The management device 102 or the computer system 700 implementing the method 800 may be included in a cloud-based managed network, an on-premises system, or another suitable network computing environment. Although illustrated as discrete blocks, one or more blocks in FIGS. 8A and 8B may be divided into additional blocks, combined into fewer blocks, or eliminated, depending on the desired implementation.

Referring to FIG. 8A, the method 800 may begin at block 802 in which metadata of a first product update may be received. The metadata may include a bulletin number, a bulletin name, a date, a threat level, a system at risk, other information regarding the first product update, or combinations thereof. The first product update may be related to a code change or a software patch of an application on one or more endpoints of a managed network. At block 804, metadata of additional product updates may be received. The metadata of the additional product updates may be similar to or the same as the metadata of the first product update. The additional product updates may be related to code changes or software patches of one or more additional applications on the endpoints. In some embodiments, the first product update and the additional product updates may be released within a predetermined time of one another. For instance, the first product update and the additional product updates may be part of a group of patches involved in a release by a single vendor on a single date.

At block 806, posts related to the first product update may be scraped or otherwise accessed. For example, the posts may be scraped from two or more internet websites, which may be different from one another. In some embodiments, for instance, posts related to the first product update may be scraped from a first website such as REDDIT® and from a second website such as TWITTER® or other some other suitable websites. In some embodiments, the scraping may be based on a data identifier. For instance, the scraping may be based on a (knowledge base) KB number or a patch bulletin number associated with the recommended patch update. At block 808, the posts may be aggregated. For example, some or all of the posts from the internet websites may be aggregated together. Aggregation may enable the posts from the websites to be analyzed together.

At block 810, a social volume of may be quantified. The social volume may be quantified from the aggregated posts. The social volume is a measure of discussion related to the first product update. In some embodiments, the social volume considers posts from different websites differently. The manner in which the social volume is quantified may be based on how a topic is conveyed between users of the website. For instance, a first website may enable a first post to be reposted. Reposting the first post spreads the content to other users of the website. A second website may enable users to view a first post and then either comment on the content of the first post or rank the content. In these embodiments, the quantifying the social volume may blend a number of reposts from the first website with the rank value from the second website to quantify a social volume on both websites. Other types of blending may be included in the quantification of social volume. For instance, a number of comments may be blended with a rank, a number of reposts may be blended with a number of comments, a number of likes may be blended with a number of reposts, etc.

At block 812, the social volume may be normalized. The social volume of the first product updates may be normalized relative to additional social volumes quantified for the additional product updates. The additional social volumes may be quantified as described in block 802, 804, 806, 808, 810, or combinations thereof Normalization in this contexts refers to standardizing the values such that an administrator is able view the social volume of the first product updates in the context of the additional social volumes quantified. For instance, the social volume of the first product updates may seem unusually high when viewed alone. However, when normalized relative to the additional social volumes, it may become apparent that all of the social volumes had high values.

At block 814, the social volume may be ranked. The social volume of the first product update may be ranked relative to the social volumes of each of the additional product updates. In some embodiments, the ranking is performed based on a percentile of the social volumes of the first product update and the additional product updates. Additionally, in some embodiments, the ranking is performed according to a K-means clustering.

Referring to FIG. 8B, at block 816 content from the aggregated posts may be extracted. In some embodiments, all of the content may be extracted. Additionally, in some embodiments, the extracting the content includes filtering non-informational content. For example, one or more of the posts may include simple, non-informational or disparaging posts. These non-informational posts may be filtered from the aggregated posts. At block 818, the posts may be summarized. The posts may be summarized into a collection of terms and phrases. The terms and phrases may be representative of a topic of the posts. For example, if multiple posts are directed to issues with a particular brand of printer, then the terms and phrases may be a term or a phrase indicating the particular brand of printer and the characteristics of the issues. The posts may be summarized based on the extracted content and/or may be based on a natural language processing (NLP) tool such as graph-based ranking operation, a Latent Dirichlet Allocation operation, or another suitable NLP tool. For instance, summarizing the posts may include application of TextRank, although other suitable ranking operations may be implemented.

At block 820, display of an indication of the social volume and of the collection of terms or phrases may be caused. The display of the social volume and the collection may be configured such that third-party information regarding the first product update is visible to an administrator. For instance, in some embodiments the indication of the social volume and of the collection of terms or phrases are displayed prior to implementation of the first product update. The administrator may accordingly have access to feedback and relevant information relate to the first product update. The administrator can act on such information. The display of the social volume and/or the collection may be displayed in a user interface, which may be configured to enable management of product updates and implementation of product updates in a managed network. The indication of the social volume may be displayed with other metadata related to the first product update as well as metadata related to the additional product updates.

In these and other embodiments, the indication of the social volume of the first product update may include an icon representative of a cluster in which the social volume falls. In some embodiments, the indication of the social volume of the first product update includes an icon representative of the percentile in which the social volume is included.

At block 822, it may be determined whether to re-scrape the websites. The determination at block 822 may be based on a set of criteria related to implementation of the first product update. The set of criteria may include whether the first product update is implemented, a characteristic of the first product update (e.g., date of release, threat level, a social volume, a number of issues identified, a number of endpoints that require the first product update, etc.). Additionally or alternatively, the determination at block 822 may be based on an interval and a particular time period. For instance, the interval may be once per day and the particular time period may be thirty (30) days, sixty (60) days, ninety (90) days or another suitable time period. During the time period, the method 800 may be determine to re-scrape the websites and upon the expiration of the particular time period, the determination at block 822 may be not to re-scrape the websites. Responsive to a determination to re-scrape the websites ("YES" at block 822), the method may proceed to block 806. Responsive to a determination not to re-scrape the websites ("No" at block 822), the method may proceed to block 828.

The method 800 may proceed to block 806 and then may proceed through one or more of blocks 808, 810, 812, 814, 816, 818, 820, or some combination thereof. In particular, the internet websites may be re-scraped (e.g., block 806) for additional posts regarding the first product update. The additional posts may be aggregated (e.g., block 808). From the aggregated additional posts, the social volume may be re-quantified (block 810), re-normalized (e.g., block 812), and re-ranked (e.g., block 814). The content of the additional posts may be extracted (e.g., block 816) and the collection may be regenerated based on a summary of the content of the additional posts (e.g., block 818). Display of an updated indication of the social volume and an updated collection of terms or phrases may be caused. The updated indication of the social volume reflects an updated social volume based on the additional posts and the updated collection is based on a summary of the additional posts.

At block 824, the first product update may be implemented. The first product update may be implemented at the endpoint. Implementation of the first product update may include a code change that is incorporated at the application to modify a portion of a code that makes up the application.

In some embodiments, the method 800 may include one or more additional steps. For instance, in some embodiments, the collection of terms or phrases or the content may be analyzed. The collection or the content may be analyzed to determine whether one of the topics of the posts is a problem or an issue with implementation of the first product update. For instance, the content of the posts may indicate that a previous patch or an updated version is necessary for proper implementation of the first product update. In these and other embodiments, responsive to the topic being the problem, the method 800 may include identifying a link to a solution to the problem, which may be included in the content or a related post. The method 800 may further include causing display or otherwise making available to the administrator the link to the solution.

Further, modifications, additions, or omissions may be made to the method 800 without departing from the scope of the present disclosure. For example, the operations of method 800 may be implemented in differing order. Furthermore, the outlined operations and actions are only provided as examples, and some of the operations and actions may be optional, combined into fewer operations and actions, or expanded into additional operations and actions without detracting from the disclosed embodiments.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general-purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

The various features illustrated in the drawings may not be drawn to scale. The illustrations presented in the present disclosure are not meant to be actual views of any particular apparatus (e.g., device, system, etc.) or method, but are representations employed to describe embodiments of the disclosure. Accordingly, the dimensions of the features may be expanded or reduced for clarity. In addition, some of the drawings may be simplified for clarity. Thus, the drawings may not depict all of the components of a given apparatus (e.g., device) or all operations of a particular method.

Terms used in the present disclosure and the claims (e.g., bodies of the appended claims) are intended as "open" terms (e.g., the term "including" should be interpreted as "including, but not limited to," the term "having" should be interpreted as "having at least," the term "includes" should be interpreted as "includes, but is not limited to," among others). Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in instances in which a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Further, any disjunctive word or phrase presenting two or more alternative terms should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

The terms "first," "second," "third," etc., are not necessarily used to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art and are to be construed as being without limitation to such specifically recited examples and conditions. Although embodiments of the present inventions have been described in detail, it should be understood that the various changes, substitutions, and alterations could be made hereto without departing from the scope of the invention.

What is claimed is:

1. A computer-implemented method of automated product update analysis and management, the method comprising executing on one or more processors the steps of:
    receiving metadata of a product update related to a code change or a software patch of an application on one or more endpoints of a managed network, wherein the product update has been implemented on at least one endpoint of the managed network;
    scraping posts related to the product update from two or more different internet websites;
    aggregating the posts from the internet websites;
    analyzing the aggregated posts, wherein the analyzing includes:
        quantifying a social volume from the aggregated posts, the social volume being a measure of discussion related to the product update;
        extracting content from the aggregated posts;
        based on the extracted content, summarizing the posts based on a graph-based ranking operation into a collection of terms or phrases that are representative of a topic of the posts;
        causing display of an indication of the social volume and of the collection of terms or phrases such that third party information regarding the product update is visible in a graphical user interface; and
    based on analysis of the aggregated posts, continue implementing the product update such that the code change is incorporated at the application to modify a portion of a code that makes up the application.

2. The method of claim 1, wherein:
    the steps further comprise:
    re-scraping the internet websites for additional posts regarding the product update; and
    causing display of an updated indication of the social volume and an updated collection of terms or phrases; and wherein:
    the updated indication of the social volume reflects an updated social volume based on the additional posts; and
    the updated collection is based on a summary of the additional posts.

3. The method of claim 2, wherein the re-scraping the internet web sites and the causing display of the updated indication is performed according to a predetermined time period.

4. The method of claim 1, wherein:
    the product update is a first product update;
    the steps further comprise:
        further receiving additional product updates, each of the additional product updates being related to code changes or software patches of one or more additional applications on the endpoints and the first product update and the additional product updates are released within a predetermined time of one another;
        normalizing the social volume of the first product updates relative to additional social volumes quantified for each of the additional product updates; and ranking the social volume of the first product update relative to the additional social volumes of each of the additional product updates;
the ranking is performed based on a percentile of the additional social volumes of the first product update and the additional product updates; and
the indication of the social volume of the first product update includes an icon representative of the percentile.

5. The method of claim 4, wherein:
the ranking is performed according to a K-means clustering; and
the indication of the social volume of the first product update includes an icon representative of a cluster.

6. The method of claim 1, wherein:
the two or more different internet web sites includes a first web site and a second web site; and
the quantifying the social volume includes blending ranks associated with each of the posts on the first website with each of the posts or re-posts in a second website.

7. The method of claim 1, wherein the steps further comprise:
analyzing the collection of terms or phrases to determine whether the topic is a problem with the product update; and
responsive to the topic being the problem:
identifying a link to a solution to the problem; and
causing display of the link.

8. The method of claim 1, wherein the extracting the content includes filtering non-informational content.

9. The method of claim 1, wherein:
the scraping is based on a data identifier associated with the product update; and
the data identifier includes a knowledge base (KB) number or a patch bulletin number associated with the product update.

10. A non-transitory computer-readable medium having encoded therein programming code executable by one or more processors to perform or control performance of operations comprising:
receiving metadata of a product update related to a code change or a software patch of an application on one or more endpoints of a managed network, wherein the product update has been implemented on at least one endpoint of the managed network;
scraping posts related to the product update from two or more different internet websites;
aggregating the posts from the internet web sites;
analyzing the aggregated posts, wherein the analyzing includes:
quantifying a social volume from the aggregated posts, the social volume being a measure of discussion related to the product update;
extracting content from the aggregated posts;
based on the extracted content, summarizing the posts based on a graph-based ranking operation into a collection of terms or phrases that are representative of a topic of the posts;
causing display of an indication of the social volume and of the collection of terms or phrases such that third party information regarding the product update is visible in a graphical user interface; and
based on analysis of the aggregated posts, continue implementing the product update such that the code change is incorporated at the application to modify a portion of a code that makes up the application.

11. The non-transitory computer-readable medium of claim 10, wherein:

re-scraping the internet websites for additional posts regarding the product update; and
causing display of an updated indication of the social volume and an updated collection of terms or phrases, wherein:
the updated indication of the social volume reflects an updated social volume based on the additional posts; and
the updated collection is based on a summary of the additional posts.

12. The non-transitory computer-readable medium of claim 11, wherein the re-scraping the internet websites and the causing display of the updated indication is performed according to a predetermined time period.

13. The non-transitory computer-readable medium of claim 10, wherein:
the product update is a first product update;
the operations further comprise:
further receiving additional product updates, each of the additional product updates being related to code changes or software patches of one or more additional applications on the endpoints and the first product update and the additional product updates are released within a predetermined time of one another;
normalizing the social volume of the first product updates relative to additional social volumes quantified for each of the additional product updates; and
ranking the social volume of the first product update relative to the additional social volumes of each of the additional product updates;
the ranking is performed based on a percentile of the additional social volumes of the first product update and the additional product updates; and
the indication of the social volume of the first product update includes an icon representative of the percentile.

14. The non-transitory computer-readable medium of claim 13, wherein:
the ranking is performed according to a K-means clustering; and
the indication of the social volume of the first product update includes an icon representative of a cluster.

15. The non-transitory computer-readable medium of claim 10, wherein:
the two or more different internet web sites includes a first web site and a second web site; and
the quantifying the social volume includes blending ranks associated with each of the posts on the first website with each of the posts or re-posts in a second website.

16. The non-transitory computer-readable medium of claim 10, wherein the operations further comprise:
analyzing the collection of terms or phrases to determine whether the topic is a problem with the product update; and
responsive to the topic being the problem:
identifying a link to a solution to the problem; and
causing display of the link.

17. The non-transitory computer-readable medium of claim 10, wherein the extracting the content includes filtering non-informational content.

18. The non-transitory computer-readable medium of claim 10, wherein:
the scraping is based on a data identifier associated with the product update; and the data identifier includes a knowledge base (KB) number or a patch bulletin number associated with the product update.

\* \* \* \* \*